US008862286B2

(12) United States Patent
Stassen et al.

(10) Patent No.: US 8,862,286 B2
(45) Date of Patent: Oct. 14, 2014

(54) INTEGRATING AVIONICS FUNCTIONS

(75) Inventors: Hans Peter Stassen, Frederick, MD (US); William James Penhallegon, Falls Church, VA (US)

(73) Assignee: The MITRE Corporation, McLean, VA (US)

( * ) Notice: Subject to any disclaimer, the term of this patent is extended or adjusted under 35 U.S.C. 154(b) by 1329 days.

(21) Appl. No.: 12/435,847

(22) Filed: May 5, 2009

(65) Prior Publication Data

US 2010/0286848 A1 Nov. 11, 2010

(51) Int. Cl.

| | |
|---|---|
| ***G01C 23/00*** | (2006.01) |
| ***G05D 1/00*** | (2006.01) |
| ***G06F 7/00*** | (2006.01) |
| ***G08G 5/00*** | (2006.01) |

(52) U.S. Cl.
CPC .................................... *G08G 5/0008* (2013.01)
USPC ................................................ 701/3; 701/14

(58) Field of Classification Search
CPC . G05D 1/0083; G05D 1/0202; G08G 5/0021; G01C 23/00
USPC .................................................. 701/3, 9, 14
See application file for complete search history.

(56) References Cited

U.S. PATENT DOCUMENTS

| | | | | |
|---|---|---|---|---|
| 6,564,149 | B2 * | 5/2003 | Lai | 701/301 |
| 6,690,298 | B1 * | 2/2004 | Barber et al. | 340/971 |
| 6,792,058 | B1 * | 9/2004 | Hershey et al. | 375/347 |
| 7,191,406 | B1 * | 3/2007 | Barber et al. | 715/771 |
| 7,342,514 | B1 * | 3/2008 | Bailey et al. | 340/961 |
| 7,382,288 | B1 * | 6/2008 | Wilson et al. | 340/972 |
| 7,564,372 | B1 * | 7/2009 | Bailey et al. | 340/961 |
| 8,386,660 | B2 * | 2/2013 | Minot | 710/12 |
| 2002/0032528 | A1 * | 3/2002 | Lai | 701/301 |
| 2005/0156777 | A1 * | 7/2005 | King et al. | 342/29 |
| 2008/0174472 | A1 * | 7/2008 | Stone et al. | 342/30 |
| 2009/0134981 | A1 * | 5/2009 | Shafaat et al. | 340/313 |
| 2009/0251358 | A1 * | 10/2009 | Becker et al. | 342/120 |
| 2011/0010036 | A1 * | 1/2011 | Ridenour et al. | 701/29 |

OTHER PUBLICATIONS

Garside, R., et al., "Integrating modular avionics: A new role emerges," Aerospace and Electronic Systems Magazine, vol. 24, No. 3, pp. 31-34, IEEE, United States (2009).
Millar J. R., "Technology trends in modern avionics," Journal of Electronic Defense, Nov. 1, 1990, Horizon House Publications, Inc., United States (1990).
Moore, J., "Advanced Distributed Architectures," The Avionics Handbook, edited by C. R. Spitzer, CRC Press LLC, United States (2001).
Quinn, G. F., et al., "Integrating Avionics in the Conceptual Design Phase," Aerospace and Electronic Systems Magazine, vol. 2, No. 11, pp. 2-4, IEEE, United States (1987).

* cited by examiner

*Primary Examiner* — Khoi Tran
*Assistant Examiner* — Jorge Peche
(74) *Attorney, Agent, or Firm* — Sterne, Kessler, Goldstein & Fox P.L.L.C.

(57) ABSTRACT

Systems, methods and computer program products for integrating one or more avionics functions are provided herein. In an embodiment avionics functions (e.g., ADS-B functions) are integrated by (1) receiving input from at least one avionics function module that executes at least one avionics function; (2) determining which of the avionics functions to allow to be engaged simultaneously, based on at different factors. In addition, embodiments select from different algorithms for the connected avionics functions.

15 Claims, 44 Drawing Sheets

| | | Engaged | | | | | | | | | | |
|---|---|---|---|---|---|---|---|---|---|---|---|---|
| | | Stagger | Cross | Hold | Follow | Merge | Pair | Pass | Space | Time Departure | Avoid Wake | Separate |
| Engaged | Stagger | O | NA | NA | NA | O | NA | NA | O | NA | S, O | S, O |
| | Cross | | NA | NA | NA | NA | NA | NA | NA | NA | S, O | S, O |
| | Hold | | | NA | NA | NA | NA | NA | NA | NA | S, O | O |
| | Follow | | | | NA | NA | NA | NA | S | NA | S, O | S, O |
| | Merge | | | | | NA | NA | NA | O | NA | S, O | S, O |
| | Pair | | | | | | NA | NA | NA | NA | S, O | O |
| | Pass | | | | | | | NA | NA | NA | S, O | S, O |
| | Space | | | | | | | | O | NA | S, O | S, O |
| | Time Departure | | | | | | | | | O | S, O | NA |
| | Avoid Wake | | | | | | | | | | O | S, O |
| | Separate | | | | | | | | | | | O |

FIG. 2A

| | | Engaged | | | | | | | | | | |
|---|---|---|---|---|---|---|---|---|---|---|---|---|
| | | Stagger | Cross | Hold | Follow | Merge | Pair | Pass | Space | Time Departure | Avoid Wake | Separate |
| Engaged | Stagger | 1-1 | 1-2 | 1-3 | 1-4 | 1-5 | 1-6 | 1-7 | 1-8 | 1-9 | 1-10 | 1-11 |
| | Cross | | 2-2 | 2-3 | 2-4 | 2-5 | 2-6 | 2-7 | 2-8 | 2-9 | 2-10 | 2-11 |
| | Hold | | | 3-3 | 3-4 | 3-5 | 3-6 | 3-7 | 3-8 | 3-9 | 3-10 | 3-11 |
| | Follow | | | | 4-4 | 4-5 | 4-6 | 4-7 | 4-8 | 4-9 | 4-10 | 4-11 |
| | Merge | | | | | 5-5 | 5-6 | 5-7 | 5-8 | 5-9 | 5-10 | 5-11 |
| | Pair | | | | | | 6-6 | 6-7 | 6-8 | 6-9 | 6-10 | 6-11 |
| | Pass | | | | | | | 7-7 | 7-8 | 7-9 | 7-10 | 7-11 |
| | Space | | | | | | | | 8-8 | 8-9 | 8-10 | 8-11 |
| | Time Departure | | | | | | | | | 9-9 | 9-10 | 9-11 |
| | Avoid Wake | | | | | | | | | | 10-10 | 10-11 |
| | Separate | | | | | | | | | | | 11-11 |

FIG. 2B

Heading / Bank Angle Command Arbitration

Avoid Wake Output Arbitration

Follow Output Arbitration

Hold Output Arbitration

Top-Level View

Sub-Algorithm 2

Sub-Algorithm 5

Sub-Algorithm 7

Sub-Algorithm 12

Sub-Algorithm 13

INTEGRATING AVIONICS FUNCTIONS

FIELD OF THE INVENTION

The present invention generally relates to avionics systems. More particularly, the invention relates to the integration of multiple avionics functions.

BACKGROUND OF THE INVENTION

Automatic Dependent Surveillance-Broadcast (ADS-B) functions are avionics function modules, well known in the art, that operate based on the automatic (without pilot command) broadcast of various parameters, such as the aircraft identification, position, route and speed. These messages are broadcast to unspecified receivers and may be intercepted by other aircraft, ground stations, ground vehicles, etc. Potential users, who are unknown by the transmitting aircraft, have the choice between processing or rejecting the messages received.

An avionics function proposes its own display features and algorithms, and makes use of the parameters received from the ADS-B broadcast. It is well known in the art of ADS-B functions and avionics functions generally, that functions generally go through a cycle where they are first selected by a user (e.g., a pilot) and operating parameters are entered. Once the parameters are entered successfully, the function is deemed to be ready to arm. Once armed, functions may be engaged. Once engaged, they are able to perform their set operations, for instance issuing various types of flight "guidance" (e.g., maneuvering guidance, auto flight commands) or outputting data to a display. Variations of this process exist, but this is the general process known in the art.

It is also generally known in the art that, during general usage, a broad range of ADS-B functions cannot be enabled simultaneously. For at least reasons such as problems with compatibility and conflicting outputs between functions, current avionics systems generally do not allow simultaneous enablement. It would be beneficial to have systems and methods that support a way of integrating a diverse set of avionics functions.

In addition, an avionics function may have a plurality of algorithms that dictate under different conditions, how they operate. Traditional methods of managing avionics functions do not provide adequate ways of selecting from available algorithms. Integrating a new approach to algorithm selection with the above mentioned systems and methods that support a way of integrating a diverse set of avionics functions would provide additional benefits.

BRIEF DESCRIPTION

Embodiments of the present invention relate to systems, methods and computer program products for the integration of avionics functions. According to an embodiment, an ADS-B function integration apparatus includes a function engagement module that resolves compatibility aspects of multiple avionics functions and allows multiple avionics functions to be simultaneously engaged, an output arbitrator module that resolves and selects outputs from one or more avionics functions, an algorithm selection module that selects algorithms associated avionics functions, and an interface controller module that controls a differential display of avionics function output to, and differential interface input from, cockpit displays According to another embodiment, a method for integrating avionics functions is provided. The method includes integrating a set of avionics functions, arbitrating function outputs, assessing function compatibility and conditions for arming, disarming, engaging and disengaging functions, and selecting the algorithms that are driving each function.

Further features and advantages, as well as the structure and operation of various embodiments are described in detail below with reference to the accompanying drawings. The drawing in which an element first appears is typically indicated by the leftmost digit in the corresponding reference number.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

FIG. 2A depicts an avionics function compatibility matrix, according to an embodiment of the present invention.

FIG. 2B depicts an avionics function compatibility matrix, according to an embodiment of the present invention.

Figure 1A:
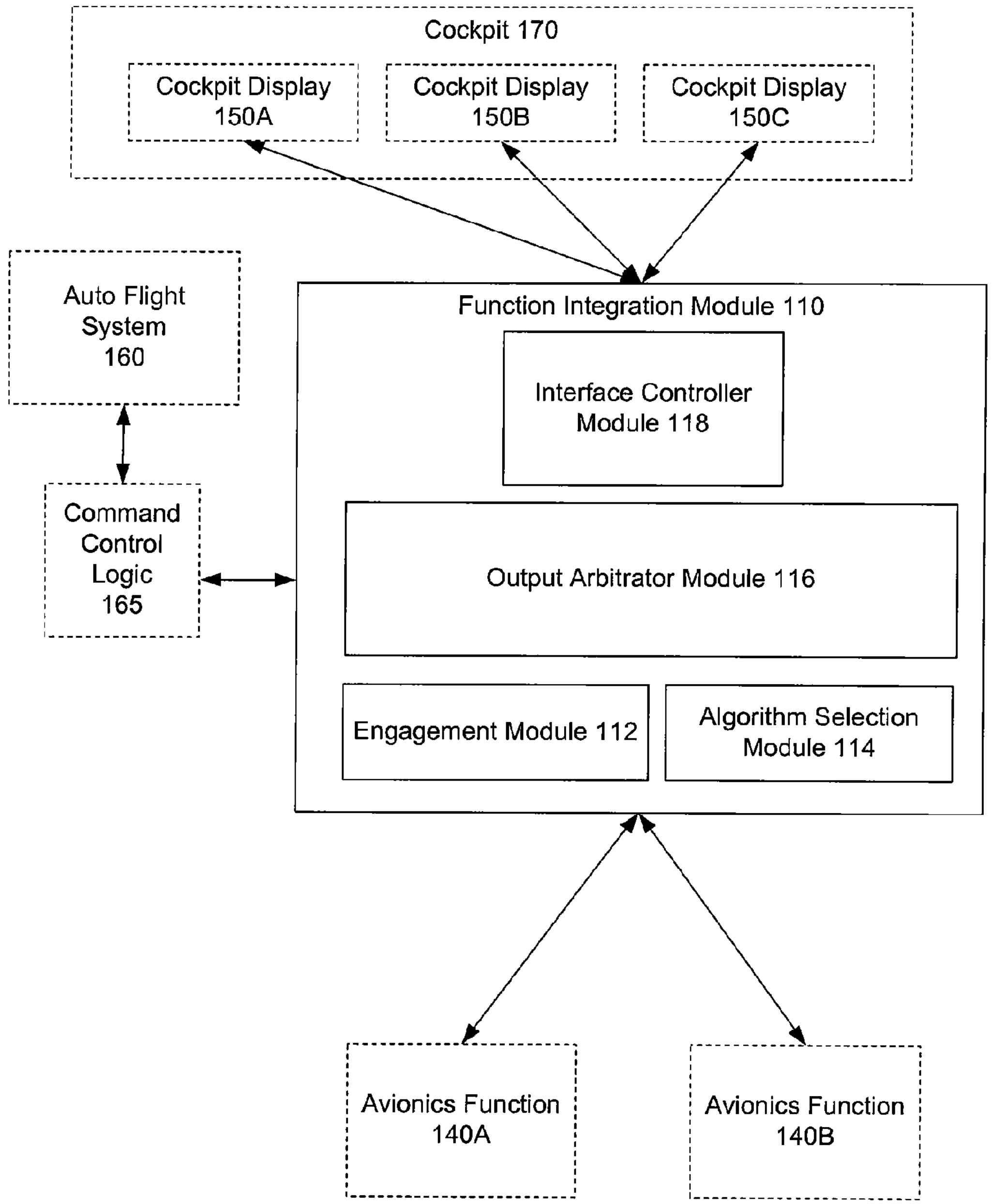
FIG. 1A depicts a system to integrate avionics functions, according to embodiments of the present invention.

I. Overview
II. Function Integration Module
III. Function Engagement Module
  a. Function Compatibility
  b. Compatibility Settings Rationale
  c. Engagement Sequence
  d. Arming Criteria
  e. Example Integrated Functions: Stagger and Space
IV. Output Arbitrator Module
  a. Function Hierarchy
  b. Output Suppression
  c. Arbitrated Function Output
V. Algorithm Selection Module
VI. Example Computer System Implementation
VII. Conclusion

DETAILED DESCRIPTION OF EMBODIMENTS

The present invention relates to integrating a diverse set of avionics functions. While the present invention is described herein with reference to illustrative embodiments for particular applications, it should be understood that the invention is not limited thereto. While ADS-B functions are mentioned throughout, the teachings herein also relate generally to the integration of avionics system functions, and the selection of algorithms therefor. Those skilled in the art with access to the teachings provided herein will recognize additional modifications, applications and embodiments within the scope thereof and additional fields in which the invention would be of significant utility. The following sections describe a system and method for integrating avionics functions in greater detail.

I. OVERVIEW

As used herein, the term "Ownship" refers to the aircraft from which embodiments described herein are being executed. Embodiments may perform data collection, processing and other embodiment functions outside of Ownship, but the users are operating the embodiments from on board Ownship. Functions may also operate with respect to one or more "reference aircraft," these being other aircraft that are visible to the functions, and directed to which functions may be executed. For example, a common situation would have Ownship using a Space function to maintain an appropriate distance to a reference aircraft.

Embodiments of the invention operate to integrate avionics functions. There are at least two levels of integrated function resolutions addressed by embodiments. First, certain function combinations may, as an example not intended to limit the invention, be redundant, inherently incompatible, inappropriate from a safety perspective or have similar problems. These enabled combinations are prohibited or restricted by embodiments using the function engagement module 112 described below. The second level of integrated function resolution involves functions that the function engagement module 112 allows to be enabled simultaneously, but that generate commands that may conflict. One skilled in the art will be familiar with this commands and their ability to provide non-coupled aircraft maneuvering guidance in the cockpit 170 of an aircraft or directly control auto flight systems 160 on board an aircraft. Embodiments herein may be coupled to control logic with such logic providing an interface with auto flight systems 160.

Another aspect referred to below is the Cockpit Display of Traffic Information (CDTI). CDTI may refer to the display of avionics function information for use by pilots in the cockpit 170 of an aircraft. CDTI also has a human control interface (HCI) aspect that allows manipulation of underlying ADS-B functions. Embodiments described herein may be integrated with a broad variety of display systems generally, and CDTI systems specifically (though any avionics system may be supported by embodiments herein). The inputs and outputs described herein may be configured to integrate with these systems. As mentioned above, in embodiments, the function integration module 110 includes a interface controller module 118. The interface controller module 118, in embodiments, is coupled to the output arbitrator, and one or more cockpit displays 150A-C. As a function of the integration of the system, the interface controller module is able to provide a differential display of integrated data on the cockpit displays 150A-C. In embodiments, this capability enhances a connected CDTI system.

Additionally, the integrated ADS-B functions described herein are able to use standard methods in the art to connect with and control auto flight systems 160. Different components described below both arbitrate the output of commands for these systems, and utilize information generated by these systems for different useful purposes. In embodiments, the output arbitrator 116 selects a command generated by a function and transfers it to control logic 165. In other embodiments, the control logic 165 may be a module within the function integration module 110 described below.

II. FUNCTION INTEGRATION MODULE (FIM)

FIG. 1A depicts embodiments of the present invention including a function integration module 110 coupled to one or more cockpit displays 150A-C and one or more avionics functions 140A-B (e.g., ADS-B functions). In embodiments, this function integration module 110 is configured to integrate a plurality of avionics functions resulting, as an example, not intended to limit the invention, in output suitable for an enhanced Cockpit Display of Traffic Information (CDTI) displayed, for example using cockpit displays 150A-C. One skilled in the art will appreciate the various additional systems that ADS-B functions could support. For instance, as discussed below, embodiments of function integration module 110 may be coupled to control logic 165. These embodiments may generate commands that may be forwarded through command logic 165 to auto flight systems 160.

This function integration module 110 may comprise an interface controller module 118, an output arbitrator module 116, an function engagement module 112 and an algorithm selection module 114. In embodiments, the function engagement module 112 resolves compatibility aspects of multiple avionics functions 140A-B and allows multiple avionics functions 140A-B to be simultaneously engaged, the output arbitrator module 116 resolves and selects outputs from one or more avionics functions and the interface controller module 118 controls a differential display of avionics function output to, and differential interface input from, a plurality of cockpit displays 150A-C (e.g., any type of electronic display). In other embodiments, an algorithm selection module 114 selects from a plurality of algorithms associated with the operation of one or more integrated avionics functions.

Embodiments described herein also support a method of integrating a set of avionics functions 140A-B, and may consider function inputs and outputs (interface controller module 118, output arbitrator module 116), conditions for arming, disarming, engaging and disengaging functions (function engagement module 112), the algorithms that are driving each function (algorithm selection module 114), the selection of sub-algorithms for functions (algorithm selection module 114) and function compatibility (function engagement module 112). The modules described herein are illustrative and not intended to limit the embodiments to a particular set of structures.

III. FUNCTION ENGAGEMENT MODULE

As described above, the function engagement module 112 is involved in at least the arming, disarming, engaging and disengaging of functions Embodiments allow the function engagement module 112 to integrate and manage one or more avionics functions 140A-B. Aspects of function compatibility, arming criteria, examples of integrated functions and other considerations are discussed below.

Some embodiments of the present invention use the function engagement module 112 to implement a "QUEUE" state between function OFF and function ARM. This state places the function in a queue, waiting to arm until other conditions are met. In embodiments, once placed in the queue state, the functions may be automatically armed according to data from inside and outside the function engagement module 112.

a. Function Compatibility

Because embodiments allow multiple functions to be armed and engaged, function compatibility is relevant, as is the prevention of the engaging of a function that may conflict with another engaged function. Embodiments described herein support the simultaneous engagement (operation) of multiple functions at least in cases where nominal operation does not require that mutually exclusive or contradictory guidance or display features be provided. As mentioned above, this section describes the first aspects of function integration with the function engagement module 112, and second aspects are described below in the output arbitrator 116 section.

As an initial consideration for some embodiments, in situations where two functions may be simultaneously engaged, it becomes necessary to specify whether the second function will be operating against the same reference aircraft as other enabled functions, or a different reference aircraft. As discussed in an example below (FIG. 3), a Space function may be applied to a first reference aircraft, while a Stagger function is applied to a second reference aircraft. This condition, as to whether multiple functions are being applied to one or more reference aircraft, is one aspect of function compatibility (whether the functions will work together) assessed by embodiments.

FIG. 2A is an example of a function compatibility matrix that shows available function combinations:

S—a cell that allows simultaneous engagement of a function combination on a single reference aircraft O—a cell that allows simultaneous engagement of a function different reference aircraft, e.g., a stagger function with aircraft #1 and space function with aircraft #2.

NA—appears in cells where simultaneous engagement is not allowed.

Note that for the purposes of the FIG. 2A example, the Avoid Collisions and Deconflict functions are considered functions that are compatible with all other functions and thus are not represented.

Different considerations may lead to the development of compatibility matrices, such as the matrix example in FIG. 2A. This compatibility matrix is used by embodiments, and the values therein may be changed over the life of embodiments based on additional considerations. Also, while pairs of integrated functions are described generally herein and specifically in FIGS. 2A-B, embodiments herein work with engaged combinations of more than two functions. Multidimensional tables, or like-structures may be used to perform analysis on these combinations according to the teachings herein.

FIG. 2A is provided for illustrative purposes only, and is not meant to limit the invention. One skilled in the art will know that different considerations may apply to different situations, and the table values could change. In addition, one skilled in the art, with familiarity with the teachings herein will be able to integrate additional functions into the described structure, using the described approaches. Embodiments herein are not limited to the avionics functions described herein, but instead can use any avionics function or function type now known or developed in the future.

b. Compatibility Settings Rationale

FIG. 2B is an example table that provides reference labels for each cell in the FIG. 2A compatibility matrix. The discussion of each cell below is provided for illustrative purposes only, and is not meant to limit embodiments. Discussion in this section as to the requirements, objectives of, compatibility, uses, usefulness, and capability of particular functions only refers to some embodiments and is not meant to limit the invention.

In embodiments, certain general principles may guide the compatibility of functions, these principles including:

G1. Function integration should be appropriate from a safety perspective.

G2. Functions should have basic compatibility, e.g., they should not pursue objectives that are mutually exclusive in the general case. For example, in order to operate effectively, the Cross function requires certainty about the route to be flown; use of the Follow function, however, implies that there is some uncertainty about the route, thus these functions may be incompatible.

G3. Redundancy between functions should be minimized.

G4. Only one instance of each function type should be allowed for each reference aircraft, e.g., the Avoid Wake function generally should not be engaged twice for the same reference aircraft.

G5. Functions should be able to satisfy the same logical constraints, e.g., some functions require Ownship and the reference aircraft to be airborne while others require the aircraft to be on the ground. Such functions would be incompatible with one another.

G6. The required tolerances for any given function should not become compromised as a result of output arbitration, e.g., arbitration between the Pair function and the Space function could cause the aft maneuvering boundary associated with the Pair function to be violated which may place Ownship at risk of encountering wake turbulence.

G7. In some embodiments, certain functions, (e.g., Avoid Collisions and Deconflict) may always be engaged. In these situations generally, only one instance of the function is allowed.

This example of principles G1-G7 is illustrative and not intended to limit the invention. As would be apparent to a person skilled in the art given these teachings, different considerations may be used as factors to guide the analysis of function compatibility. In addition, one skilled in the art could use these teachings to formulate additional principles.

Persons skilled in the art will appreciate that different considerations may apply to different situations. In addition, one skilled in the art, with familiarity with the teachings herein will be able to integrate additional functions and rationale into the described structure, using the described approaches.

The FIG. 2B reference labels for FIG. 2A cells according to an embodiment of the invention, are described below. The following table describes example goals for ADS-B functions included in FIGS. 2A-B. Alternate goals and additional are possible in different embodiments according to the teachings herein.

TABLE 1

Example ADS-B Functions

| Function | Goal | Function Output Type: Speed Guidance | Function Output Type: Lateral Guidance | Function Output Type: Other Guidance |
|---|---|---|---|---|
| Stagger | Allows Ownship to maintain a desired diagonal stagger value from a reference aircraft. | X | | |
| Cross | Allows Ownship to achieve a separation from its reference aircraft at the closest point of approach. | X | | |
| Hold | Allows Ownship to follow a reference aircraft out of the hold at a predetermined interval. | X | X | |
| Follow | Allows Ownship to follow the path of a reference aircraft, with or without a parallel offset | | X | |
| Merge | Allows Ownship to merge behind a reference aircraft at a downstream location. The location and interval may or may not be specified. If an interval is specified, the merge function will automatically become Space after the merge has been accomplished. | X | X | |
| Pair | Typically used during an approach, provides forward and aft maneuvering bounds to protect Ownship from collision and wake turbulence encounters. | X | | |
| Pass | Allows Ownship to achieve a separation from its reference aircraft at the closest point of approach. | | X | |
| Space | Allows Ownship to maintain a desired spacing value from a reference aircraft. | X | | |
| Time Departure | Tells ownship how much time it has to start takeoff roll in order to be guaranteed protection from wake turbulence encounters.. | | | Countdown Timer |
| Avoid Wake | Provides situational awareness information of reference aircraft vertical history information. | | | Reference aircraft vertical profile history |
| Separate | Alerts Ownship when it is likely to violate a specified minimum distance from a reference aircraft. | | | Minimum distance alert |

The discussion of each cell below is provided for illustrative purposes only, and is not meant to limit embodiments. Discussion in this section as to the requirements, objectives of, compatibility, uses, usefulness, and capability of particular functions only refers to some embodiments and is not meant to limit the invention.

Cell 1-1 Stagger-Stagger

Result: Simultaneous Engagements Allowed: Other Aircraft Only

Rationale: As described below in FIG. 3, in embodiments, the Stagger function produces a speed command that maintains the desired stagger value. Because, in embodiments, the output arbitrator 116 is capable of arbitrating multiple speed commands, simultaneous engagement of two stagger commands is possible. However, it may not be useful to engage more than one instance of the Stagger function on the same reference aircraft. If a single value was given as an input to both instances of the function, the execution of the second instance would be redundant and thus, in embodiments, simultaneous engagements are allowed for other aircraft only. In the case where two different Stagger values are given for the same reference aircraft, there may be no logical way of satisfying both constraints at the same time.

Cell 1-2 Stagger-Cross

Result: Simultaneous Engagements Allowed: None

Rationale: In embodiments, the Cross function provides speed guidance to achieve a separation from its reference aircraft at the closest point of approach only. Based on the operation of the Cross command, in embodiments, the desired separation value will result for only an instant and will not be maintained. This objective is incompatible with functions that achieve stable spacing conditions, such as Stagger, Merge and Space functions.

Cell 1-3 Stagger-Hold

Result: Simultaneous Engagements Allowed: None

Rationale: Holding involves frequent turning and complete course reversals. Such maneuvering is inherently incompatible with the notion of maintaining a staggered separation with an aircraft operating on a parallel path.

Cell 1-4 Stagger-Follow

Result: Simultaneous Engagements Allowed: None (Optionally, Same or Other Aircraft)

Rationale: Embodiments may not allow this engagement combination because the Stagger function requires Ownship and the reference aircraft to be operating on essentially parallel paths. The presence of the Follow function indicates some uncertainty about what the future path will be and therefore seems incompatible with the need to establish parallel trajectories. However, embodiments could relax these restrictions. If Stagger and Follow are engaged with different reference aircraft, one could provide stagger guidance as long as the flight paths remain parallel. If Stagger and Follow are engaged with the same reference aircraft, embodiments may use the offset capability of the Follow function to ensure that the tracks remain parallel.

Cell 1-5 Stagger-Merge

Result: Simultaneous Engagements Allowed: Other Aircraft Only

Rationale: The objectives of merging with an aircraft at some downstream location while simultaneously maintaining a fixed stagger value relative to the same aircraft are generally incompatible. An embodiment could allow engagement of the two functions using different reference aircraft for each. By processes described further below, embodiments of the output arbitrator 116 may need to resolve the outputs from each function appropriately.

Cell 1-6 Stagger-Pair

Result: Simultaneous Engagements Allowed: None

Rationale: The Pair function provides speed guidance in situations where precise maintenance of the desired interval is essential. There are forward and aft maneuvering bounds associated with the concepts that the pair function supports. These bounds are essential in protecting Ownship from collision and wake turbulence encounters. Because of this, output arbitration between the speed guidance that the Pair function provides and any other speed guidance would not be appropriate from a safety perspective, and thus the functions could not be enabled simultaneously according to the matrix.

Cell 1-7 Stagger-Pass

Result: Simultaneous Engagements Allowed: None

Rationale: The Pass function provides lateral guidance to achieve a separation from its reference aircraft at the closest point of approach only. The notion of providing potentially continuously varying lateral guidance (the Pass function) is incompatible with the need to establish a parallel track with a reference aircraft for which a Stagger function has been applied. This rationale applies in the case of a single and a different reference aircraft Cell 1-8 Stagger-Space Result: Simultaneous Engagements Allowed: Other Aircraft Only Rationale: As described further at the discussion of FIG. 3, it is possible to follow two aircraft operating on parallel paths and maintain a spacing interval from one and a stagger interval from the other. In this case, speed command output could be arbitrated by the output arbitrator 116 such that the lower of the two speed commands is presented to the crew through displays 150A-C, or directed to command control logic 165.

Cell 1-9 Stagger-Time Departure

Result: Simultaneous Engagements Allowed: None

Rationale: Stagger requires Ownship and the reference aircraft to be airborne, while Time Departure requires both aircraft to be on the ground and thus the functions are inherently incompatible.

Cell 1-10 Stagger-Avoid Wake

Result: Simultaneous Engagements Allowed: Same or Other Aircraft

Rationale: In some embodiments, the Avoid Wake function provides situation awareness only, no guidance. Other embodiments may combine this function with other functions and utilize its broad range of possible outputs, e.g., commands and data display.

Cell 1-11 Stagger-Separate

Result: Simultaneous Engagements Allowed: Same or Other Aircraft

Rationale: Separate adds a minimum distance alert and can be used to augment the Stagger function if needed.

Cell 2-2 Cross-Cross

Result: Simultaneous Engagements Allowed: None

Rationale: The Cross function provides speed guidance to achieve a separation from its reference aircraft at the closest point of approach only. Based on the operation of the Cross function in combination, the desired separation value will result for only an instant and will not be maintained, and thus the combination is deemed incompatible. This objective is incompatible both in the case of a different interval for the same reference aircraft, and in the case of any interval with another reference aircraft.

Cell 2-3 Cross-Hold

Result: Simultaneous Engagements Allowed: None

Rationale: Holding involves frequent turning and complete course reversals. Such maneuvering is inherently incompatible with the Cross function, and thus this function combination is deemed incompatible.

Cell 2-4 Cross-Follow

Result: Simultaneous Engagements Allowed: None

Rationale: In order to operate effectively, the Cross function requires certainty about the route to be flown. The use of the Follow function, however, implies that there is some uncertainty about the route, thus this function combination is deemed incompatible.

Cell 2-5 Cross-Merge

Result: Simultaneous Engagements Allowed: None

Rationale: Merging behind an aircraft while simultaneously attempting to cross behind the same aircraft is generally not a recognized maneuver. Therefore, engagement of these two functions with the same reference aircraft is restricted. In the case where one might desire to engage the two functions with different reference aircraft, output arbitration could be used to resolve speed command conflicts. However, the above described potential use of the cross function involves providing an exact separation interval at the closest point of approach (within tolerances). Therefore, any scheme that would suppress its guidance may obviate the need for it Cell 2-6 Cross-Pair Result: Simultaneous Engagements Allowed: None Rationale: The Pair function provides speed guidance in situations where precise maintenance of the desired interval is essential. In fact, there are forward and aft maneuvering bounds associated with the concepts that the Pair function supports. These bounds are essential in protecting Ownship from collision and wake turbulence encounters. Arbitration between the speed guidance that the Pair function provides and any other speed guidance may not be appropriate from a safety perspective.

Cell 2-7 Cross-Pass

Result: Simultaneous Engagements Allowed: None

Rationale: The Cross function uses speed guidance to achieve a desired separation at the closest point of approach. The Pass function uses lateral guidance to achieve the same objective. Engaging these two functions with the same reference aircraft could create instability in the guidance provided. Because the envisioned use of the Cross and Pass functions would be to provide an exact separation interval at the closest point of approach (within tolerances), the general case for different reference aircraft does not allow the requirements of both functions to be satisfied simultaneously, and thus these functions are incompatible.

Cell 2-8 Cross-Space

Result: Simultaneous Engagements Allowed: None

Rationale: In embodiments, Spacing behind an aircraft and crossing the same aircraft's flight path are inherently incompatible. In other embodiments, speed arbitration, as described herein could be used to reconcile this incompatibility. However as a general principle, the envisioned use of the Cross function would be to provide an exact separation interval at the closest point of approach (within tolerances). Therefore, any scheme that would suppress guidance from the Cross function would obviate the need for it.

Cell 2-9 Cross-Time Departure

Result: Simultaneous Engagements Allowed: None

Rationale: The Cross function requires Ownship and the reference aircraft to be airborne, while Time Departure requires both aircraft to be on the ground, thus these functions are inherently incompatible.

Cell 2-10 Cross-Avoid Wake

Result: Simultaneous Engagements Allowed: Same or Other Aircraft

Rationale: In some embodiments, the Avoid Wake function provides situation awareness only, no guidance. Other embodiments may combine this function with other functions and utilize its broad range of possible outputs, e.g., commands and data display.

Cell 2-11 Cross-Separate

Result: Simultaneous Engagements Allowed: Same or Other Aircraft

Rationale: Separate adds a minimum distance alert and may be used to augment the Cross function if needed.

Cell 3-3 Hold-Hold

Result: Simultaneous Engagements Allowed: None

Rationale: The hold function generally provides speed guidance to allow Ownship to follow a reference aircraft out of the hold at a predetermined interval. Speed guidance provided by one instance of the hold function would be redundant or incompatible with the speed guidance provided by another instance of the same function.

Cell 3-4 Hold-Follow

Result: Simultaneous Engagements Allowed: None

Rationale: Because holding patterns can vary in size and shape, it is envisioned that a capability that provides an effective holding exit interval will need to provide some lateral guidance as well. This lateral guidance could interfere with guidance provided by the Follow function, thus this function combination is incompatible.

Cell 3-5 Hold-Merge

Result: Simultaneous Engagements Allowed: None

Rationale: Attempting to operate in a holding pattern at a desired interval behind a reference aircraft while simultaneously attempting to merge behind the same or another aircraft either at the holding fix or at another fix is generally not possible.

Cell 3-6 Hold-Pair

Result: Simultaneous Engagements Allowed: None

Rationale: A paired approach is inherently incompatible with holding.

Cell 3-7 Hold-Pass

Result: Simultaneous Engagements Allowed: None

Rationale: Passing behind another aircraft is inherently incompatible with holding.

Cell 3-8 Hold-Space

Result: Simultaneous Engagements Allowed: None

Rationale: Simultaneous engagement of Hold and Space with the same reference aircraft is precluded because the Hold function already provides the needed speed guidance. Simultaneous engagement of Hold and Space with different reference aircraft is precluded because conducting holding operations with one aircraft is not compatible with spacing behind another aircraft on a non-holding trajectory.

Cell 3-9 Hold-Time Departure

Result: Simultaneous Engagements Allowed: None

Rationale: Hold requires Ownship and the reference aircraft to be airborne, while Time Departure requires both aircraft to be on the ground, thus, these functions are not compatible.

Cell 3-10 Hold-Avoid Wake

Result: Simultaneous Engagements Allowed: Same or Other Aircraft

Rationale: In some embodiments, the Avoid Wake function provides situation awareness only, no guidance. Other embodiments may combine this function with other functions and utilize its broad range of possible outputs, e.g., commands and data display.

Cell 3-11 Hold-Separate

Result: Simultaneous Engagements Allowed: Other Aircraft Only (Optionally Same Aircraft)

Rationale: In embodiments, the Hold function provides all of the outputs needed to safely conduct holding operations. Therefore, in some embodiments, a design decision was made not to allow simultaneous engagement of the Hold and Separate functions with the same reference aircraft. However, in another embodiment, this constraint could be removed. The decision to follow this latter strategy would depend heavily on the manner in which the outputs from the Separate function are rendered by embodiments on the display. If the outputs are rendered such that only a single instance of the Separate function can be supported, restricting simultaneous engagement with the same reference aircraft may be appropriate.

Cell 4-4 Follow-Follow

Result: Simultaneous Engagements Allowed: None

Rationale: The Follow function provides lateral guidance. Under current embodiments, arbitration of conflicting lateral guidance cues has not been fashioned. Future embodiments could resolve conflicting lateral guidance cues and thus allow simultaneous engagement.

Cell 4-5 Follow-Merge

Result: Simultaneous Engagements Allowed: None

Rationale: In order to function effectively, the Merge function requires certainty about the lateral path to be flown. The use of the Follow function implies that this certainty does not exist. Moreover, in some cases the Merge function computes its own notion of what the lateral path should be in order to effect a smooth merge operation. This notion could well find itself in conflict with the guidance generated by the Follow function.

Cell 4-6 Follow-Pair

Result: Simultaneous Engagements Allowed: None

Rationale: These functions are not compatible. The Pair function provides speed guidance in situations where precise maintenance of the desired interval and nearly parallel paths is essential. The use of the Follow function implies that there is some uncertainty about the future path and is incompatible with the need to guarantee parallel paths.

Cell 4-7 Follow-Pass

Result: Simultaneous Engagements Allowed: None

Rationale: Follow and Pass each provide lateral guidance. This guidance is generally incompatible.

Cell 4-8 Follow-Space

Result: Simultaneous Engagements Allowed: Same Aircraft Only

Rationale: The combination of lateral and speed guidance to follow behind a single reference aircraft could prove useful in a variety of situations where following is required but the exact future path is not known. However, following of the path of one aircraft while spacing behind another aircraft that is operating on the same path is inherently incompatible.

Cell 4-9 Follow-Time Departure

Result; Simultaneous Engagements Allowed: None

Rationale: Follow requires Ownship and the reference aircraft to be airborne, while Time Departure requires both aircraft to be on the ground.

Cell 4-10 Follow-Avoid Wake

Result: Simultaneous Engagements Allowed: Same or Other Aircraft

Rationale: In some embodiments, the Avoid Wake function provides situation awareness only, no guidance. Other embodiments may combine this function with other functions and utilize its broad range of possible outputs, e.g., commands and data display.

Cell 4-11 Follow-Separate

Result: Simultaneous Engagements Allowed: Same or Other Aircraft

Rationale: Separate adds a minimum distance alert and may be used to augment the Follow function if needed.

Cell 5-5 Merge-Merge

Result: Simultaneous Engagements Allowed: None (Optionally, Other Aircraft Only)

Rationale: Current embodiments do not allow simultaneous engagement of more than one merge function, because the potential errors associated with simultaneous treatment of multiple merges and the impacts on those errors on the orderly flow of air traffic are not well understood. Speed arbitration could alleviate these problems, and current restrictions could be lifted in future embodiments.

Cell 5-6 Merge-Pair

Result: Simultaneous Engagements Allowed: None

Rationale: Simultaneous merging and paired approach operations with the same aircraft are inherently incompatible. In the case of more than one reference aircraft, any arbitration between the speed guidance that the Pair function provides and the speed guidance from the Merge function may be accomplished by embodiments described herein, but may not be appropriate from a safety perspective.

Cell 5-7 Merge-Pass

Result: Simultaneous Engagements Allowed: None

Rationale: In order to function effectively, the Merge function requires certainty about the lateral path to be flown. The Pass function provides its own lateral guidance which could erode the required certainty, thus, this function combination is not compatible.

Cell 5-8 Merge-Space

Result: Simultaneous Engagements Allowed: Other Aircraft Only

Rationale: Merging with and simultaneously spacing behind the same aircraft are generally incompatible. However, it may be possible to merge with one aircraft while spacing behind another.

Cell 5-9 Merge-Time Departure

Result: Simultaneous Engagements Allowed: None

Rationale: Merge requires Ownship and the reference aircraft to be airborne, while Time Departure requires both aircraft to be on the ground; thus, these functions are inherently incompatible.

Cell 5-10 Merge-Avoid Wake

Result: Simultaneous Engagements Allowed: Same or Other Aircraft

Rationale: In some embodiments, the Avoid Wake function provides situation awareness only, no guidance. Other embodiments may combine this function with other functions and utilize its broad range of possible outputs, e.g., commands and data display.

Cell 5-11 Merge-Separate

Result: Simultaneous Engagements Allowed: Same or Other Aircraft.

Rationale: Separate adds a minimum distance alert and may be used to augment the Merge function if needed.

Cell 6-6 Pair-Pair

Result: Simultaneous Engagements Allowed: None

Rationale: It is not appropriate to attempt to conduct more than one paired approach operation at a time.

Cell 6-7 Pair-Pass

Result: Simultaneous Engagements Allowed: None

Rationale: The Pass function produces lateral guidance that would not be appropriate to follow during paired approach operations.

Cell 6-8 Pair-Space

Result: Simultaneous Engagements Allowed: None

Rationale: In embodiments, simultaneous engagement of the Pair and Space functions is not allowed because it is not envisioned that a crew would receive a clearance from air traffic control to space behind one aircraft and conduct paired approach operations with another. These types of logical restriction based on ATC requirements, custom, and other similar factors may be considered by embodiments. Furthermore, the tolerances for paired approach operations are generally such that speed command arbitration would be inappropriate.

Cell 6-9 Pair-Time Departure

Result: Simultaneous Engagements Allowed: None

Rationale: Pair requires Ownship and the reference aircraft to be airborne, while Time Departure requires both aircraft to be on the ground; thus, these functions are inherently incompatible.

Cell 6-10 Pair-Avoid Wake

Result: Simultaneous Engagements Allowed: Same or Other Aircraft

Rationale: In some embodiments, the Avoid Wake function provides situation awareness only, no guidance. Other embodiments may combine this function with other functions and utilize its broad range of possible outputs, e.g., commands and data display.

Cell 6-11 Pair-Separate

Result: Simultaneous Engagements Allowed: Other Aircraft Only

Rationale: The Pair function provides all of the outputs needed to safely conduct paired approach operations. The paired approach function computes its own safe maneuvering bounds. Use of the Separate function with the same reference aircraft as that used for the Pair function would be inappropriate.

Cell 7-7 Pass-Pass

Result: Simultaneous Engagements Allowed: None

Rationale: Each instance of the Pass function would generally produce lateral guidance which could not be effectively arbitrated.

Cell 7-8 Pass-Space

Result: Simultaneous Engagements Allowed: None

Rationale: While the Space function does not provide lateral guidance and does not require knowledge of the planned future path of the reference aircraft, it is intended to be used mainly when Ownship will be following the same path or the same path plus a parallel offset as the reference aircraft. The Pass function's continuously varying lateral guidance is generally incompatible with the need to keep Ownship on the Space function's reference aircraft's path; thus, these functions are not compatible with each other.

Cell 7-9 Pass-Time Departure

Result: Simultaneous Engagements Allowed: None

Rationale: Pass requires Ownship and the reference aircraft to be airborne, while Time Departure requires both aircraft to be on the ground; thus, these functions are inherently incompatible.

Cell 7-10 Pass-Avoid Wake

Result: Simultaneous Engagements Allowed: Same or Other Aircraft

Rationale: In some embodiments, the Avoid Wake function provides situation awareness only, no guidance. Other embodiments may combine this function with other functions and utilize its broad range of possible outputs, e.g., commands and data display.

Cell 7-11 Pass-Separate

Result: Simultaneous Engagements Allowed: Same or Other Aircraft

Rationale: Separate adds a minimum distance alert and can be used to augment the Pass function if needed.

Cell 8-8 Space-Space

Result: Simultaneous Engagements Allowed: Other Aircraft Only

Rationale: Embodiments do not allow for the simultaneous engagement of more than one instance of the Space function, based on the assumption that the space function would only be used if operating on the same path as the reference aircraft. However, as with the Stagger-Space function combination, embodiments could allow the possibility of spacing simultaneously behind separate reference aircraft on parallel offset paths.

Cell 8-9 Space-Time Departure

Result: Simultaneous Engagements Allowed: None

Rationale: Pass requires Ownship and the reference aircraft to be airborne, while Time Departure requires both aircraft to be on the ground; thus, these functions are inherently incompatible.

Cell 8-10 Space-Avoid Wake

Result: Simultaneous Engagements Allowed: Same or Other Aircraft

Rationale: In some embodiments, the Avoid Wake function provides situation awareness only, no guidance. Other embodiments may combine this function with other functions and utilize its broad range of possible outputs, e.g., commands and data display.

Cell 8-11 Space-Separate

Result: Simultaneous Engagements Allowed: Same or Other Aircraft Rationale: Separate adds a minimum distance alert and may be used to augment the Space function if needed.

Cell 9-9 Time Departure-Time Departure

Result: Simultaneous Engagements Allowed: Other Aircraft Only

Rationale: Simultaneous engagement of more than one instance of the Time Departure function on separate aircraft could be permitted by embodiments. To enhance this capability, an embodiment could enhance the output arbitrator to include a component dedicated to arbitrating timer outputs.

Cell 9-10 Time Departure-Avoid Wake

Result: Simultaneous Engagements Allowed: Same or Other Aircraft

Rationale: In some embodiments, the Avoid Wake function provides situation awareness only, no guidance. Other embodiments may combine this function with other functions and utilize its broad range of possible outputs, e.g., commands and data display.

Cell 9-11 Time Departure-Separate

Result: Simultaneous Engagements Allowed: None

Rationale: These functions are incompatible because Separate is an airborne function and Time Departure is a ground function; thus, these functions are inherently incompatible.

Cell 10-10 Avoid Wake-Avoid Wake

Result: Simultaneous Engagements Allowed: Other Aircraft Only

Rationale: Embodiments support the simultaneous enablement of two Avoid Wake functions on separate reference aircraft. Also, in some embodiments, the Avoid Wake function provides situation awareness only, no guidance. Other embodiments may combine this function with other functions and utilize its broad range of possible outputs, e.g., commands and data display.

Cell 10-11 Avoid Wake-Separate

Result: Simultaneous Engagements Allowed: Same or Other Aircraft

Rationale: In some embodiments, the Avoid Wake function provides situation awareness only, no guidance. Other embodiments may combine this function with other functions and utilize its broad range of possible outputs, e.g., commands and data display.

c. Engagement Sequence

One embodiment dictates that, if multiple armed functions are incompatible with each other, they may only be engaged in the sequence in which they were armed by the user after all previous incompatible engaged functions have disengaged. Other embodiments could take an alternative approach, allowing a selective ordering of function enablement.

d. Arming Criteria

In embodiments, there may be criteria used to guide the arming process, such criteria measuring different function input factors. For example, surveillance quality may affect whether a function may be armed or engaged. In different embodiments, one function could be used in a variety of contexts, each requiring a different level of surveillance quality. One approach used by embodiments is to determine the required surveillance quality for each function by assessing the separation/spacing distance in use at the time.

In another embodiment, the surveillance quality monitoring discussed above tracks one or more aircraft within surveillance range, and continually trims the tracks so as to only provide outputs determined to be relevant to Ownship.

e. Example Integrated Functions: Stagger and Space

As would be appreciated by one skilled in the art, the Stagger function is designed to achieve stable spacing conditions with an aircraft operating on a parallel path (staggered separation) by producing a speed command. The Space function is designed to maintain a stable distance behind a leading aircraft by producing a speed command. The Space function is used mainly when Ownship will be following the same path or the same path plus a parallel offset as the reference aircraft.

Figure 3:
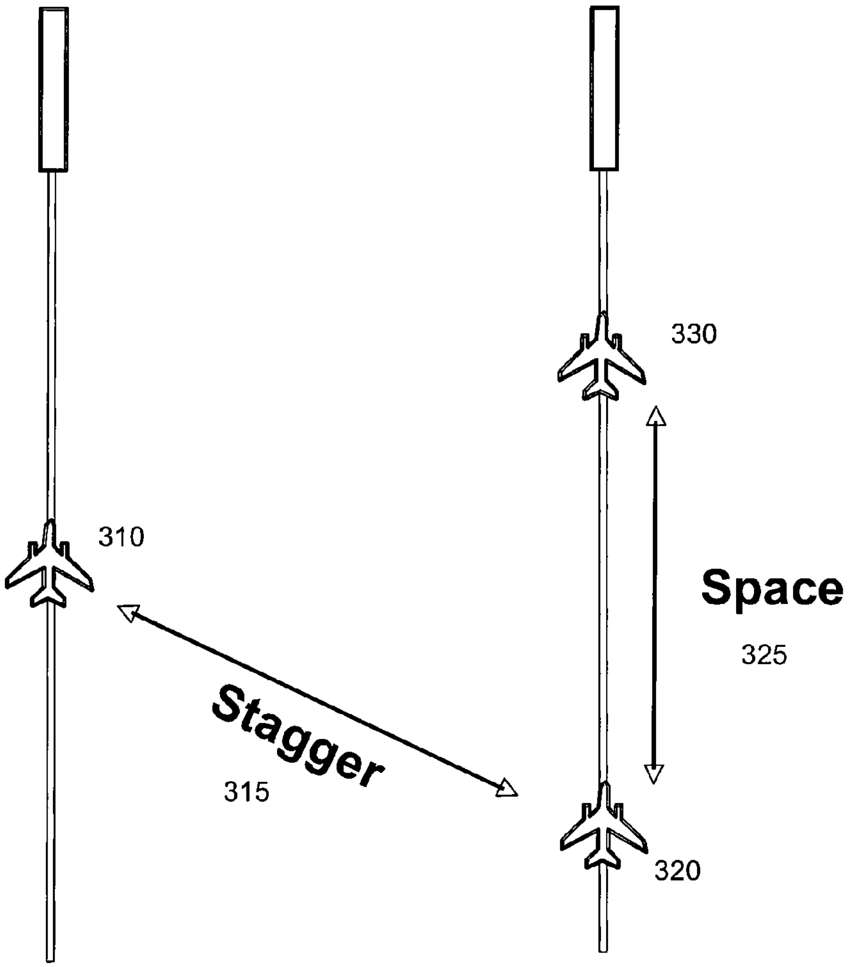
FIG. 3 depicts the simultaneous engagement of two avionics functions, according to an embodiment of the present invention.

In the example scenario depicted in FIG. 3, pilots of Ownship 320, using embodiments of the present invention, seek to perform a stagger function 315 with aircraft 310 and a space function 325 with aircraft 330. By allowing function integration and output arbitration, embodiments described herein enable this flight maneuver.

This situation illustrates the integration rule enforced by some embodiments described above: if two speed commands are issued by simultaneously enabled commands, the slower of the two should control. If, for instance, the stagger function 315 issued a faster speed command than the space function 325 (e.g., if aircraft 310 was traveling faster than aircraft 330) then an unsafe circumstance could arise if the faster stagger speed command were followed.

IV. OUTPUT ARBITRATOR MODULE

In embodiments, the output arbitrator module 116 resolves outputs from multiple functions 140A-B. As discussed above, this second level of integrated function resolution involves functions that the function engagement module 112 allows to be enabled simultaneously, but that may generate avionics commands or data output that may conflict. One skilled in the art will be familiar with these "commands" and their ability to provide maneuvering guidance or directly control auto flight systems on an aircraft, e.g., changing speed, changing heading, etc. In some embodiments, the first step to arbitrating function output is to differentiate between different priorities of functions.

a. Function Hierarchy

In order to guide the resolution of conflicts between function outputs, some embodiments classify or prioritize functions according to a hierarchical system. Embodiments provide an implementation structure whereby complex conflict resolution and output suppression hierarchy rules may be implemented.

For instance, in one approach taken using a function hierarchy the following levels apply:

Level 1 Functions (suppresses Level 2 and 3 outputs)
  Example: Avoid Collisions
Level 2 Functions (suppresses Level 3 outputs)
  Example: Deconflict
Level 3 Functions
  Examples: Avoid Wake, Cross, Hold, Follow, Merge, Pair, Pass, Separate, Space, Stagger, Time Departure This example of levels 1-3 is illustrative and not intended to limit the invention. As would be apparent to a person skilled in the art given these teachings, different approaches to prioritizing functions may be used. In addition, one skilled in the art could use these teachings to design prioritization factors for other functions as well or other output suppression hierarchies.

To illustrate the concepts behind the assignment of levels 1 and 2: With embodiments, during nominal, conflict-free operations the Avoid Collisions function and Deconflict function, generally should not produce any outputs. As would be appreciated by one skilled in the art, during non-nominal operations or when conflict geometries develop, following the hierarchy rationale above, outputs from lower level functions would be suppressed in order to prevent function conflicts with lower priority functions.

b. Output Suppression

In an example, two functions are simultaneously engaged, and each is generating its own speed command. As would be known by one skilled in the art, certain commands may be mutually exclusive in their guidance, e.g., an auto flight system 160 generally can only act on one speed command at a time. The output arbitrator applies algorithms to resolve conflicting command outputs in this situation. As discussed above, as an example not intended to limit the invention, when multiple speed commands are available, one rule could dictate that the lowest speed command is chosen. Other commands and command conflicts are similarly handled by principles known to those in the art.

Embodiments described herein allow, in certain cases, for the suppression of the output of one function by another. In one embodiment, this output suppression affects only the commands provided by the function. In another embodiment however, the suppression extends to all outputs that function provides.

Certain resolution rules may exist, in embodiments, within the function levels as well. As an example, in one embodiment, if two level 3 functions are able to provide speed guidance (commands), the lower speed value is allowed. Additional principles may also guide embodiments in this multiple conflicting command situation, for instance: in an embodiment, if one of the two functions providing speed commands becomes disengaged, the other command is prevented from immediately supplanting the disabled command, rather no speed commands are sent. This example shows how embodiments may follow principles of avionics safety and function structure and illustrate one type of transition between commands from different functions.

c. Arbitrated Function Output

Figure 5A:
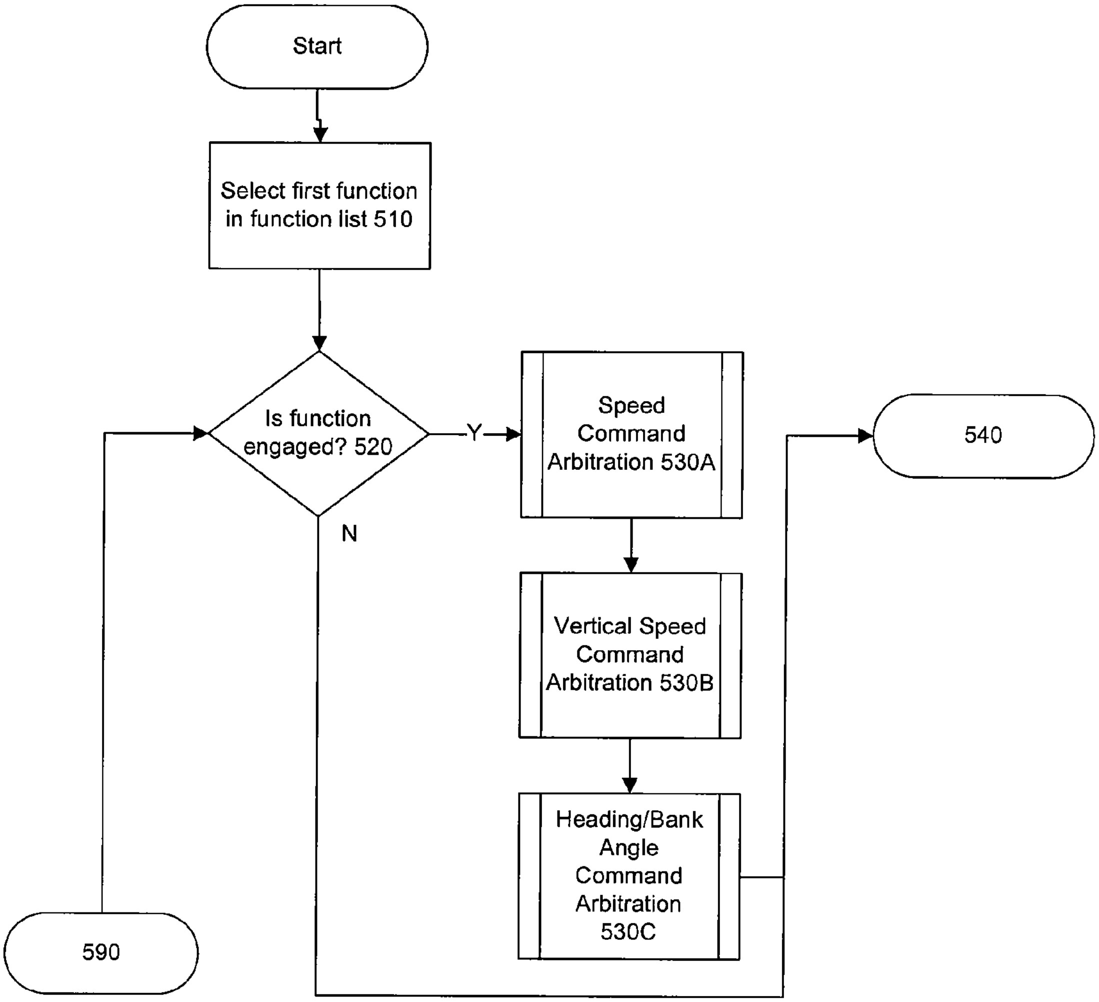
FIGS. 5A-C depict an avionics function output arbitration process, according to embodiments of the present invention.
Figure 5B:
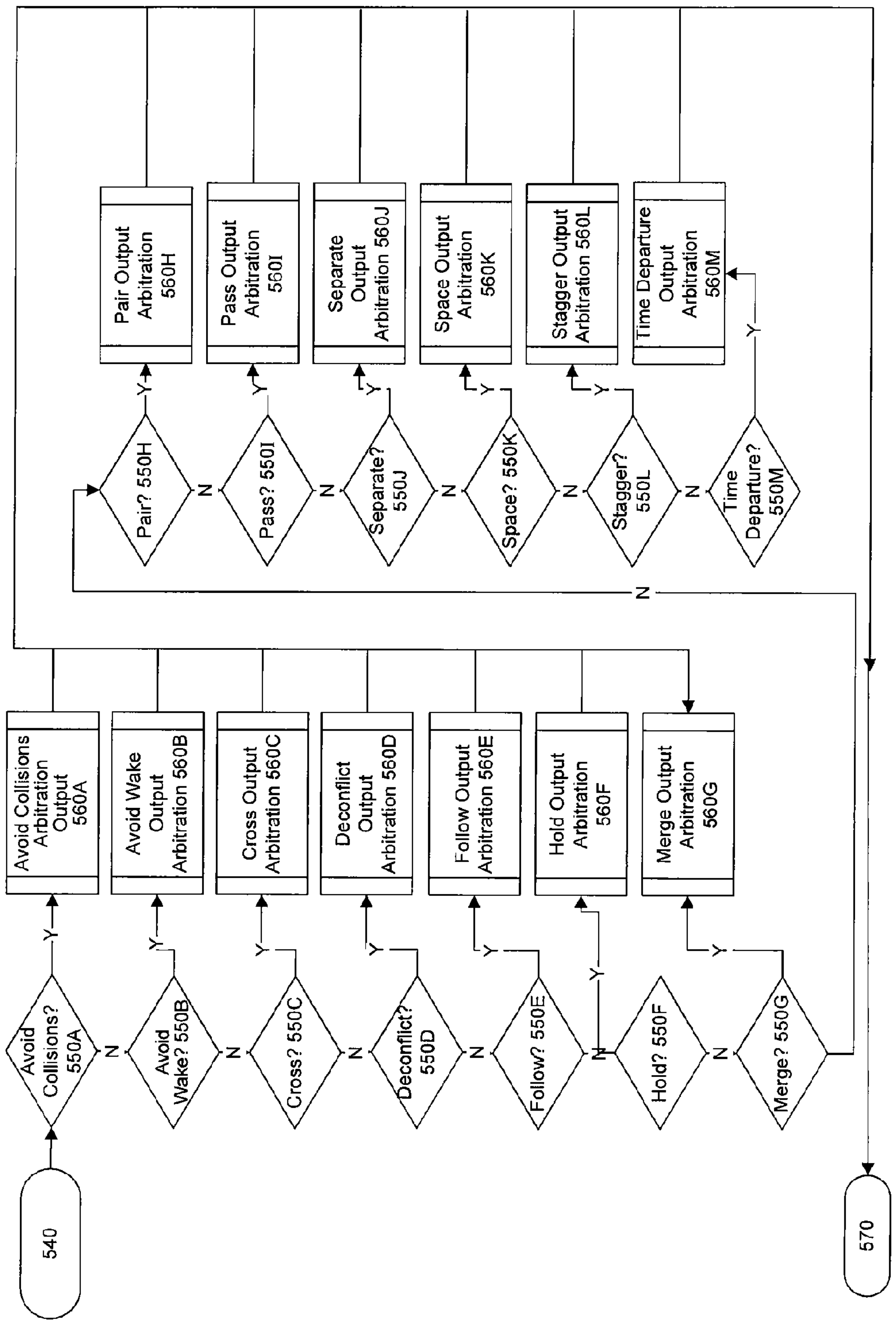
Figure 5C:
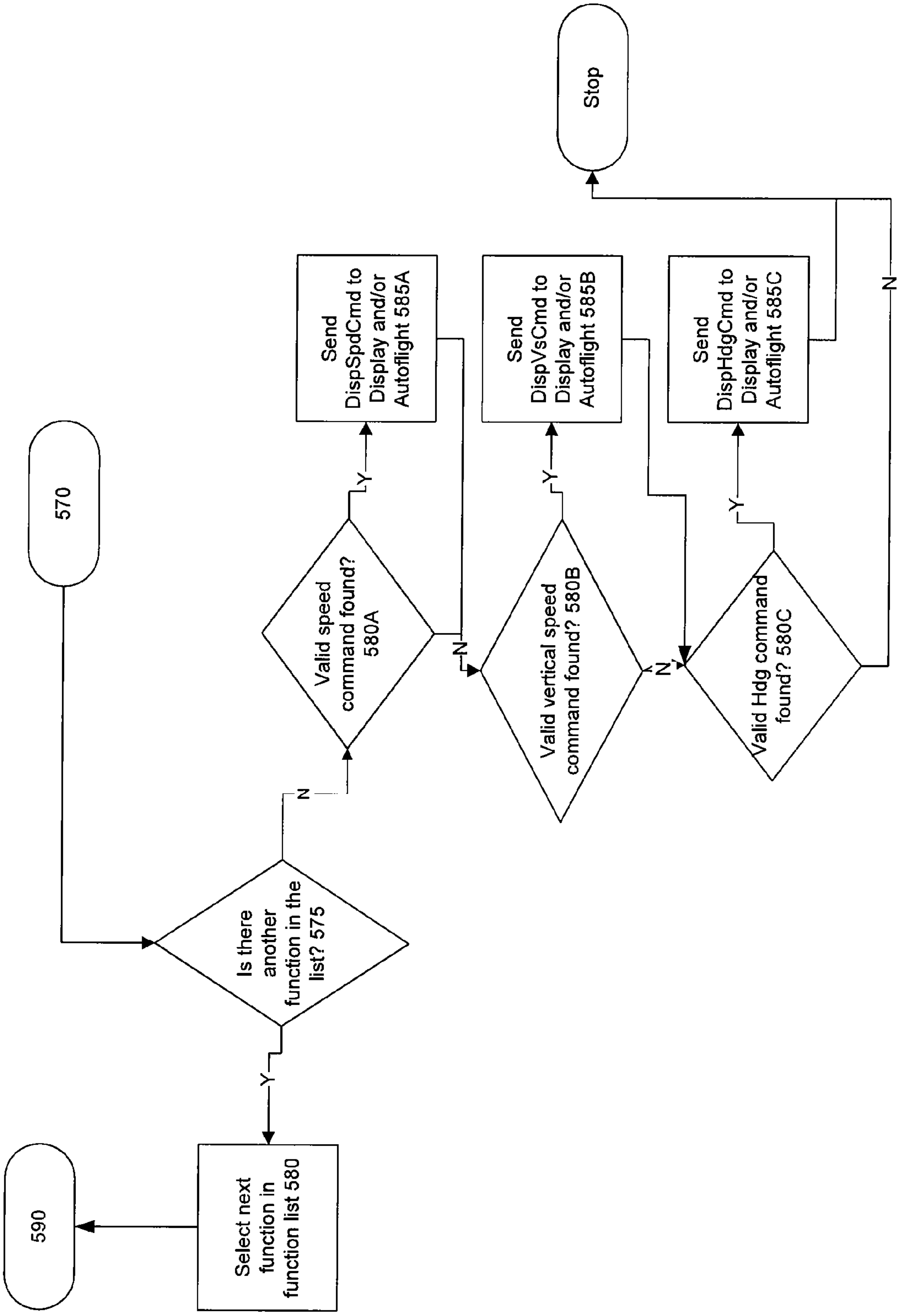

Some embodiments accomplish output arbitration (resolution) in two stages. FIGS. 5A-C depict an embodiment of a first stage of output arbitration. In embodiment, this first stage relates primarily to guidance outputs (e.g., auto flight guidance, commands). Once this first stage is completed by embodiments, secondary output arbitration approaches, specific to each function, are followed, e.g., Avoid Collisions Arbitration Output, Avoid Wake Output Arbitration. The second stage, in embodiments relates to additional information (e.g., display information). Embodiments are not limited to this approach, and one skilled in the art would appreciate different methods of arbitrating output.

In step 510, a first function is selected from the list of pending functions (function list). In embodiments, this list is populated by a control interface, in other embodiments it may be populated automatically or by a combination of manual and automatic approaches, based on conditions. The selected function is checked in step 520 to see if it has been engaged. If engaged, the flow of the process is directed first to speed command arbitration 530A, then to vertical speed command arbitration 530B and next to heading/bank angle command arbitration 530C. In embodiments, this 530 stage provides an initial output arbitration of three significant commands. One skilled in the art will appreciate that additional commands may be added to this initial phase, to reflect different system considerations.

Figure 6A:
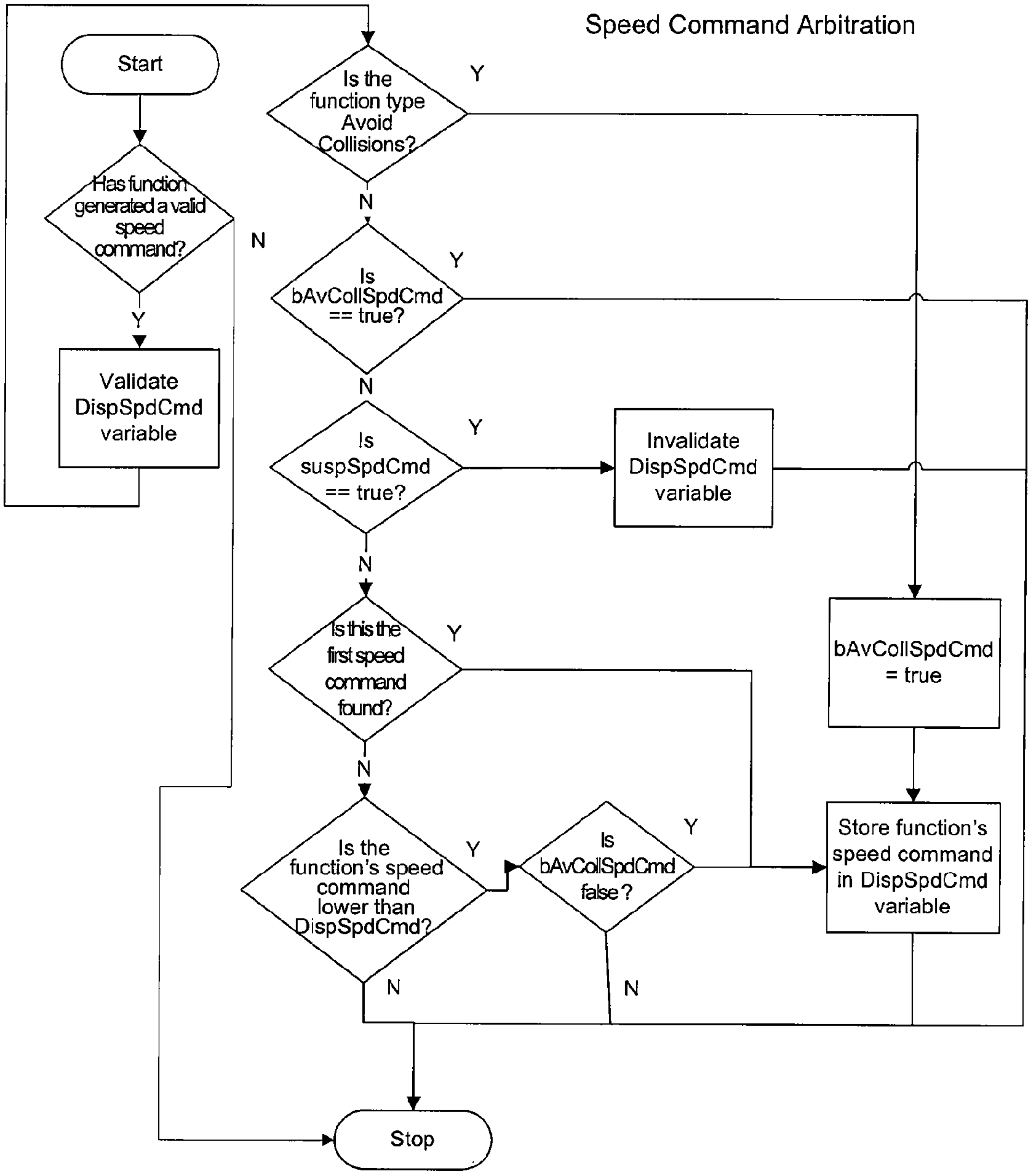
FIGS. 6A-6O depict example output arbitration processes for different avionics functions, according to embodiments of the present invention.
Figure 6B:
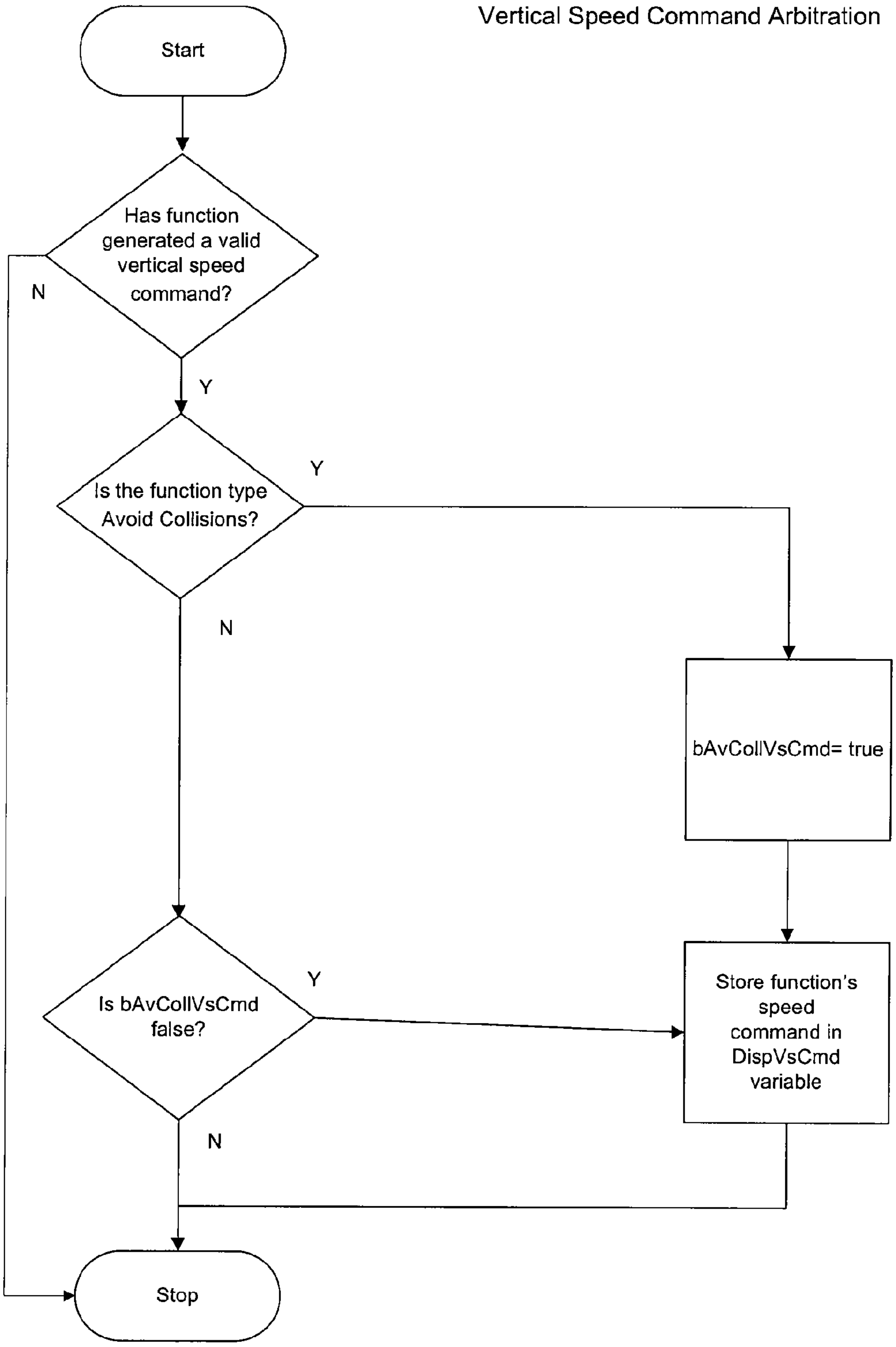
Figure 6C:
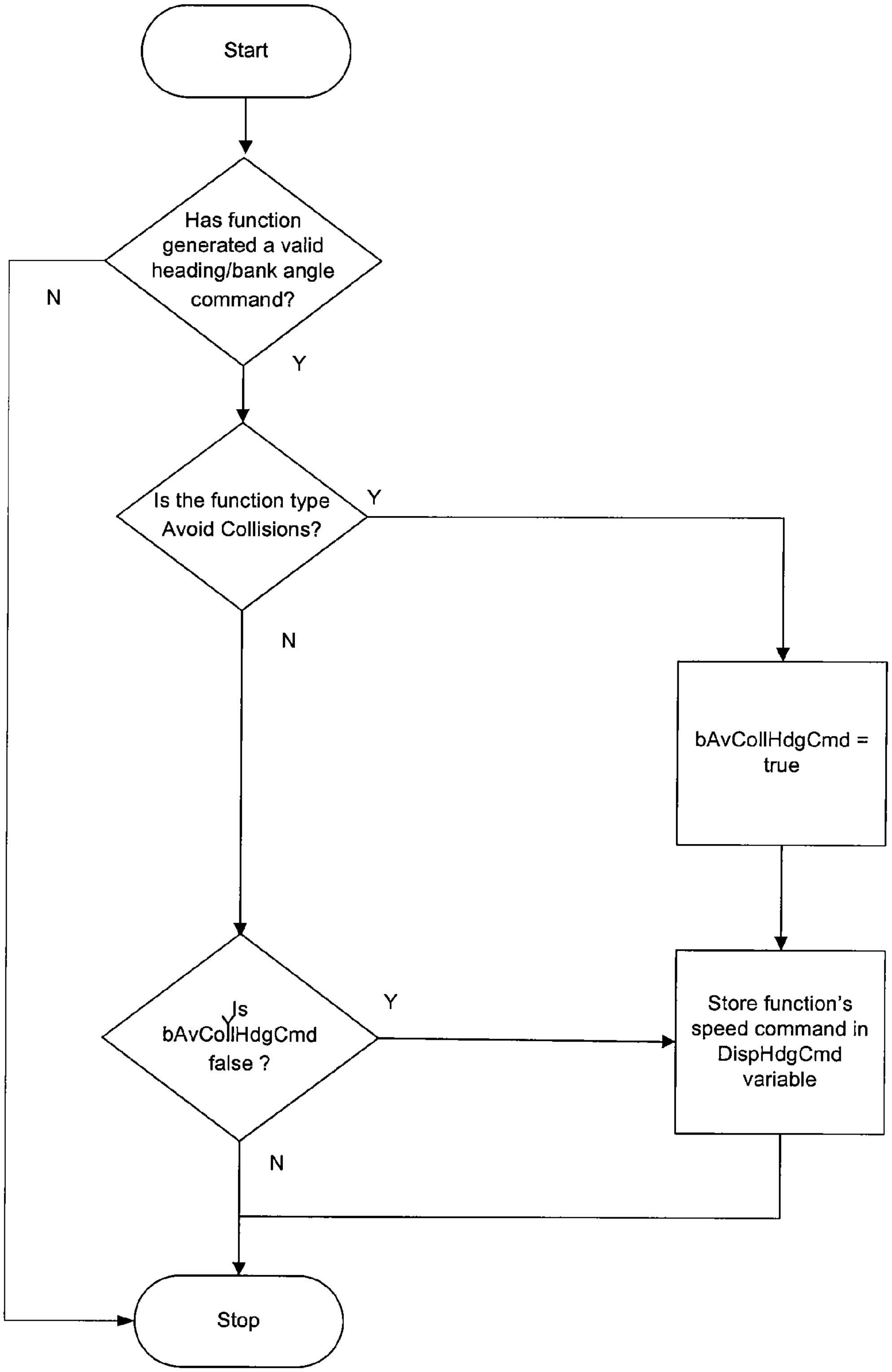
Figure 6D:
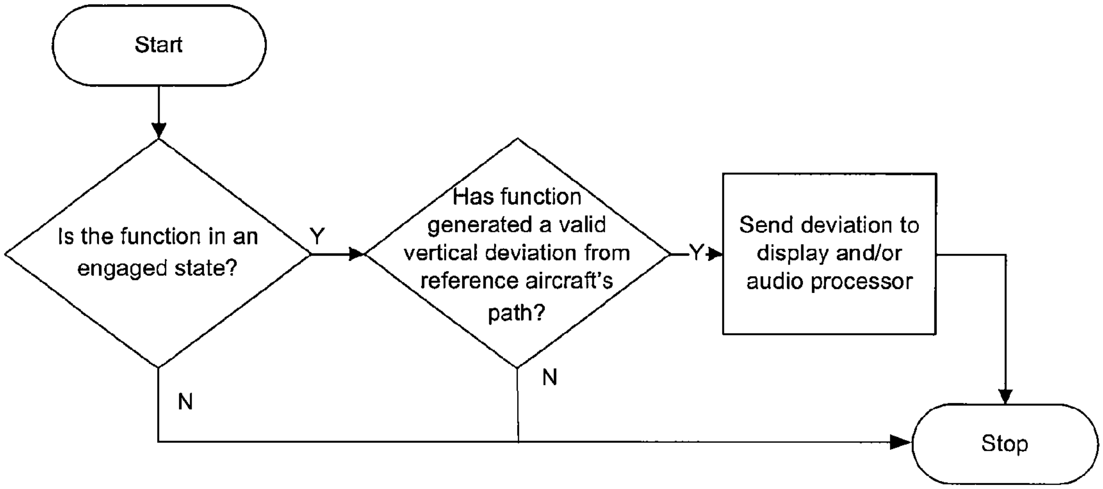
Figure 6E:
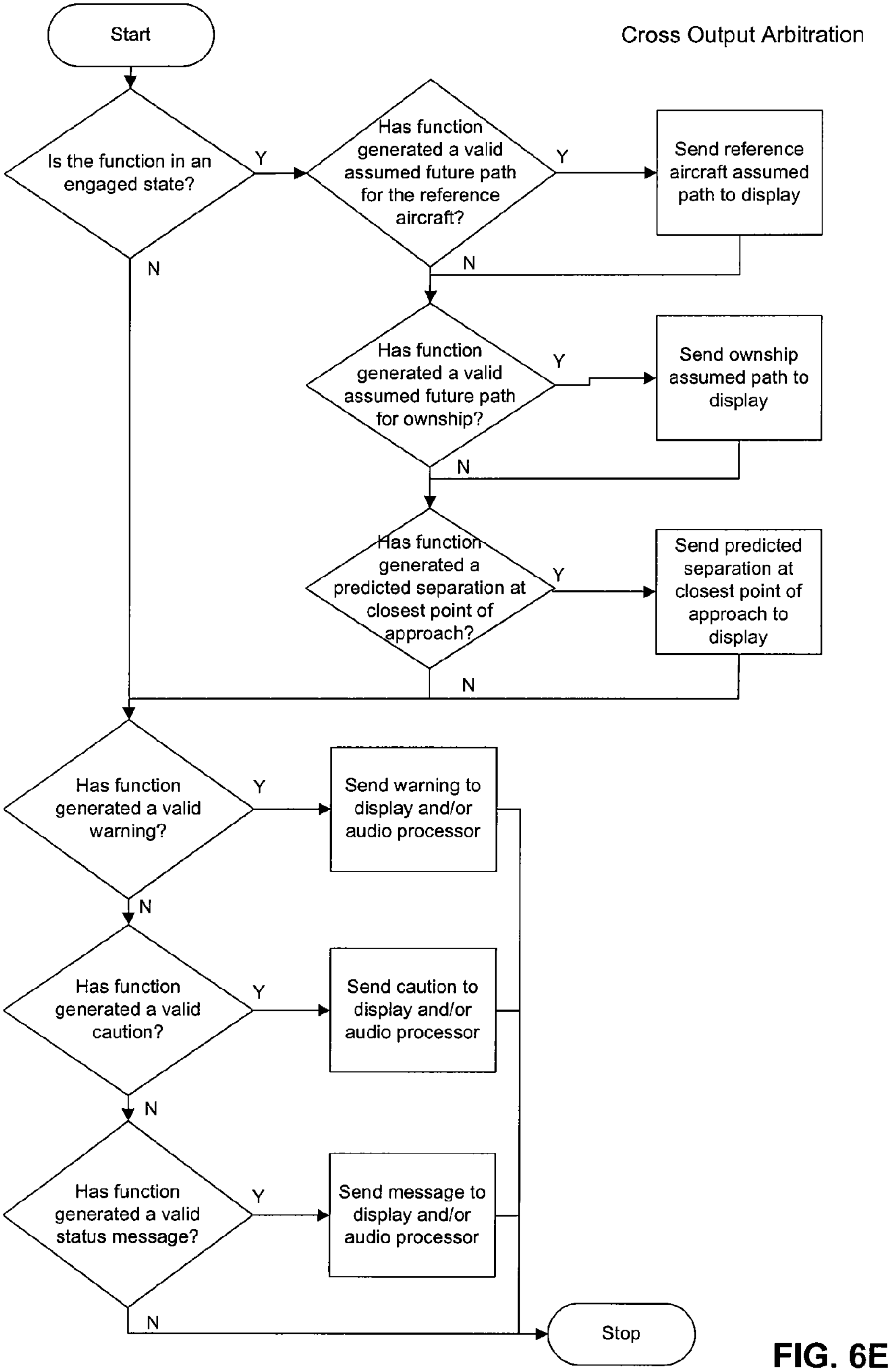
Figure 6F:
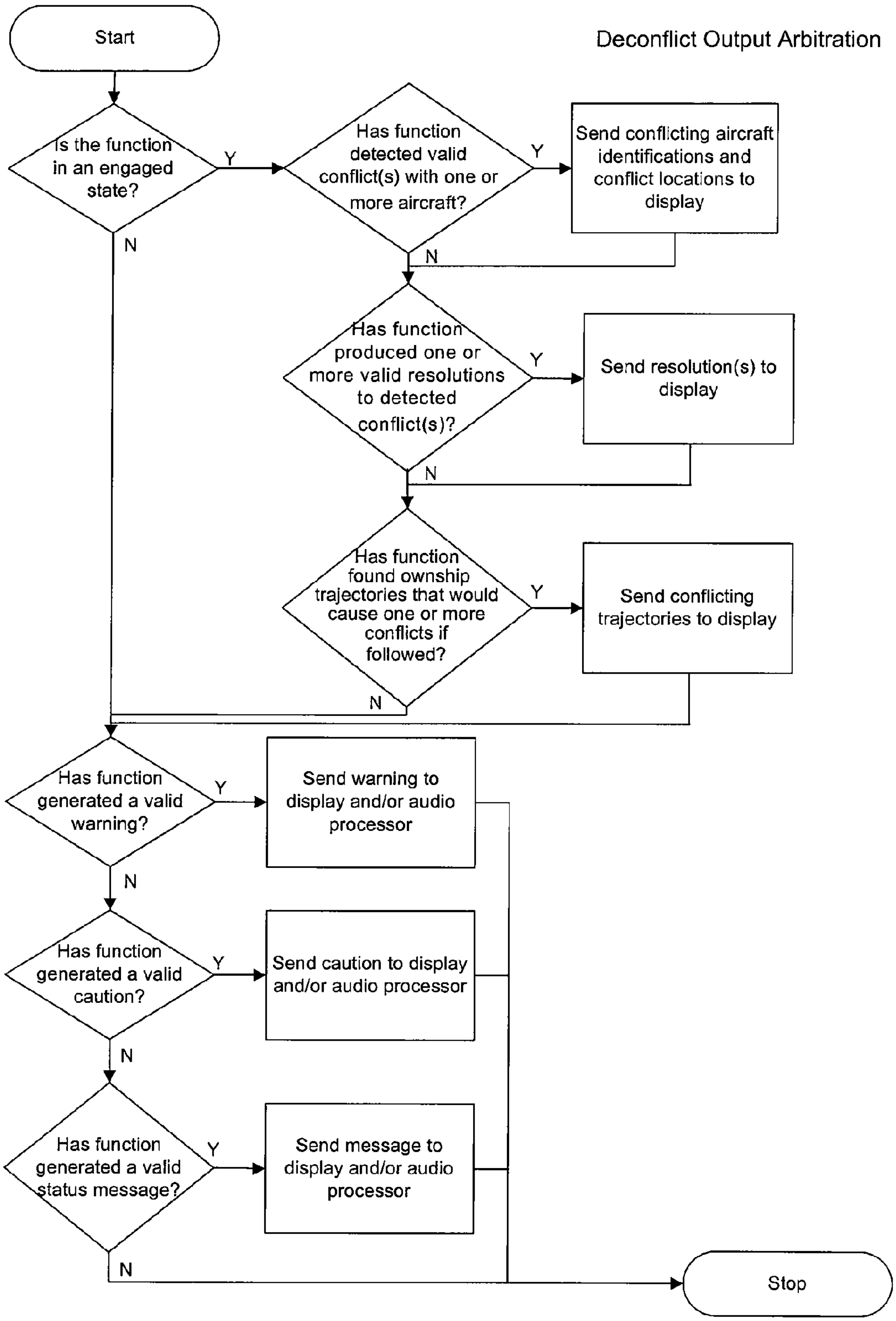
Figure 6G:
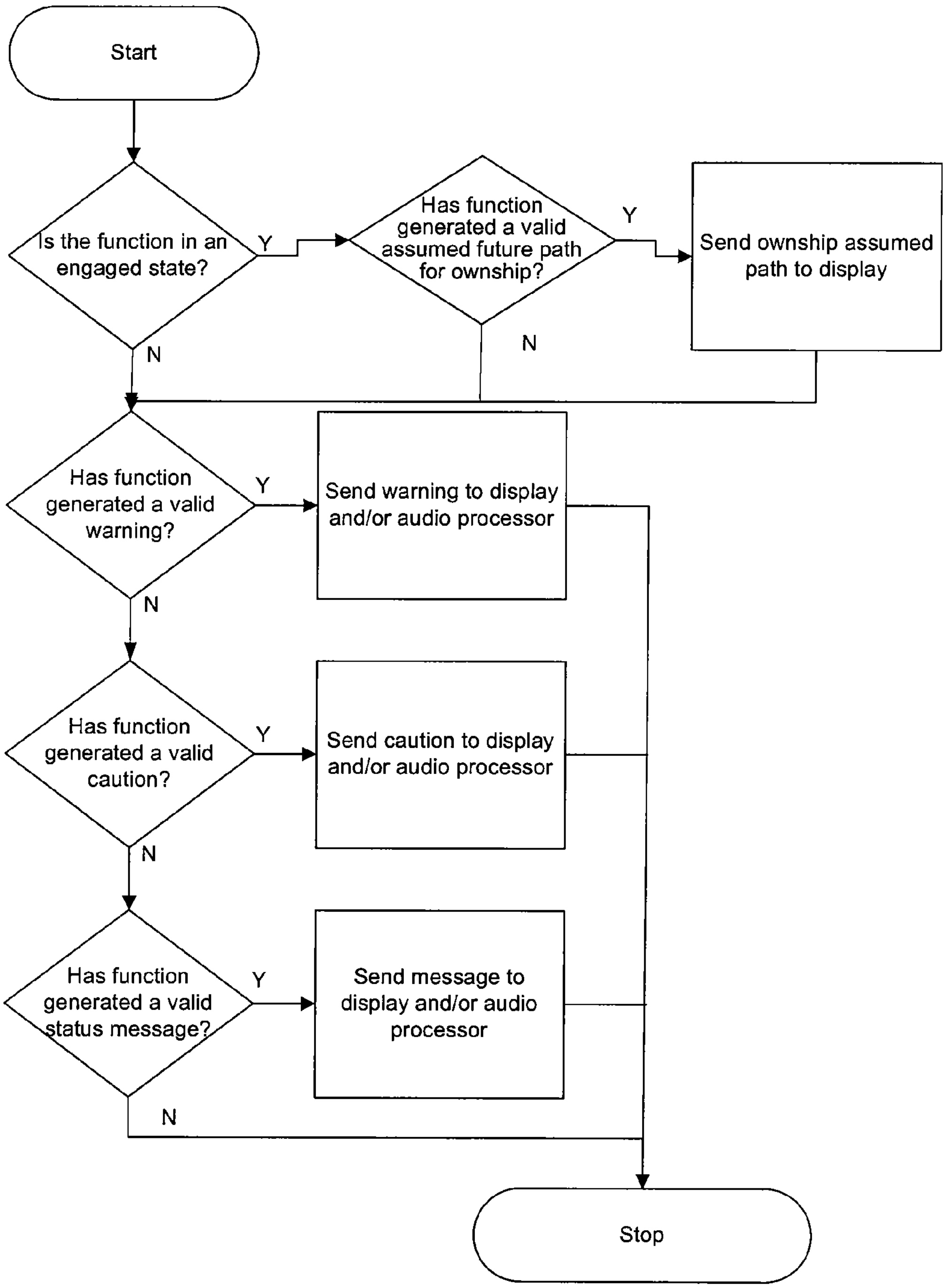
Figure 6H:
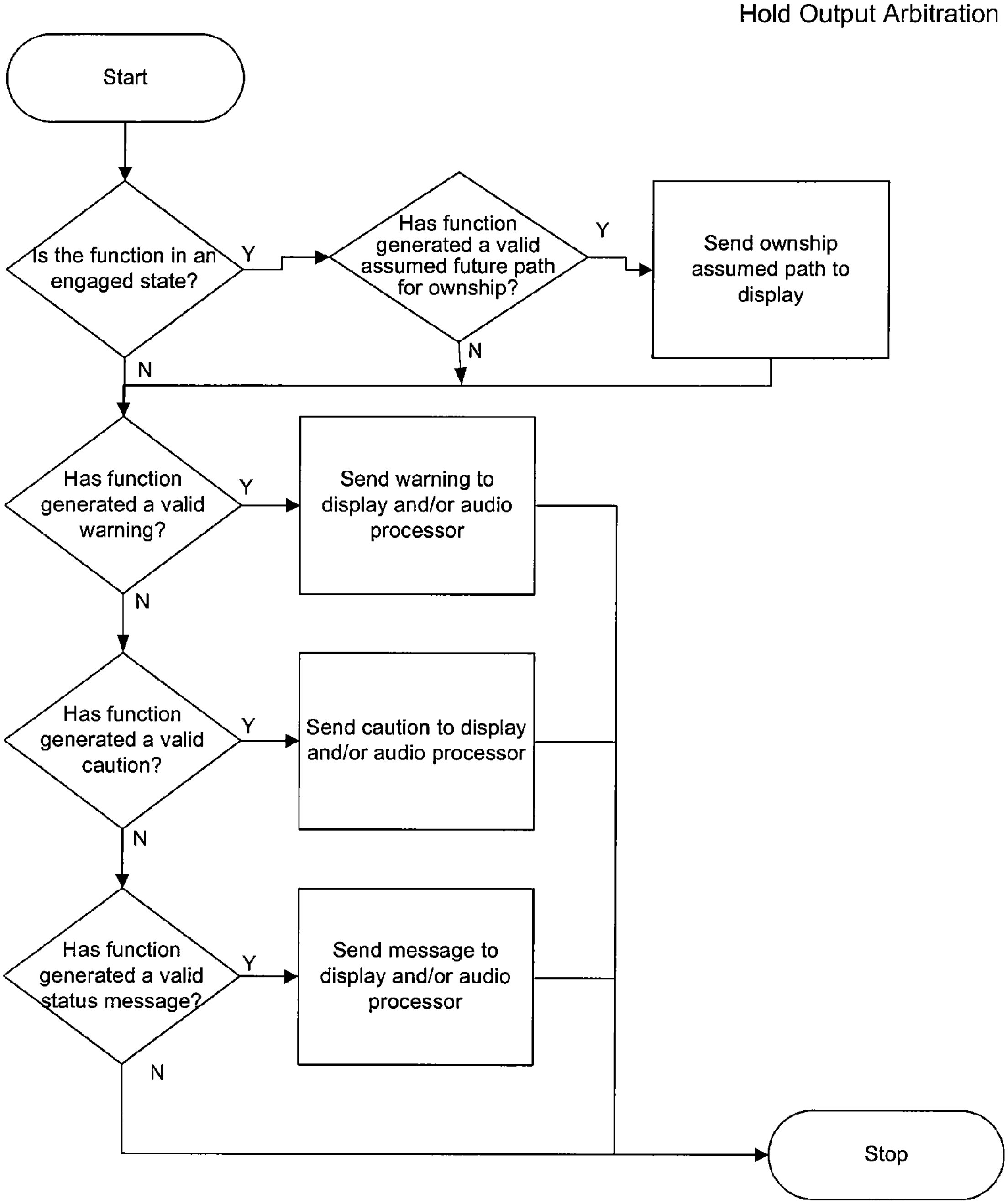
Figure 6I:
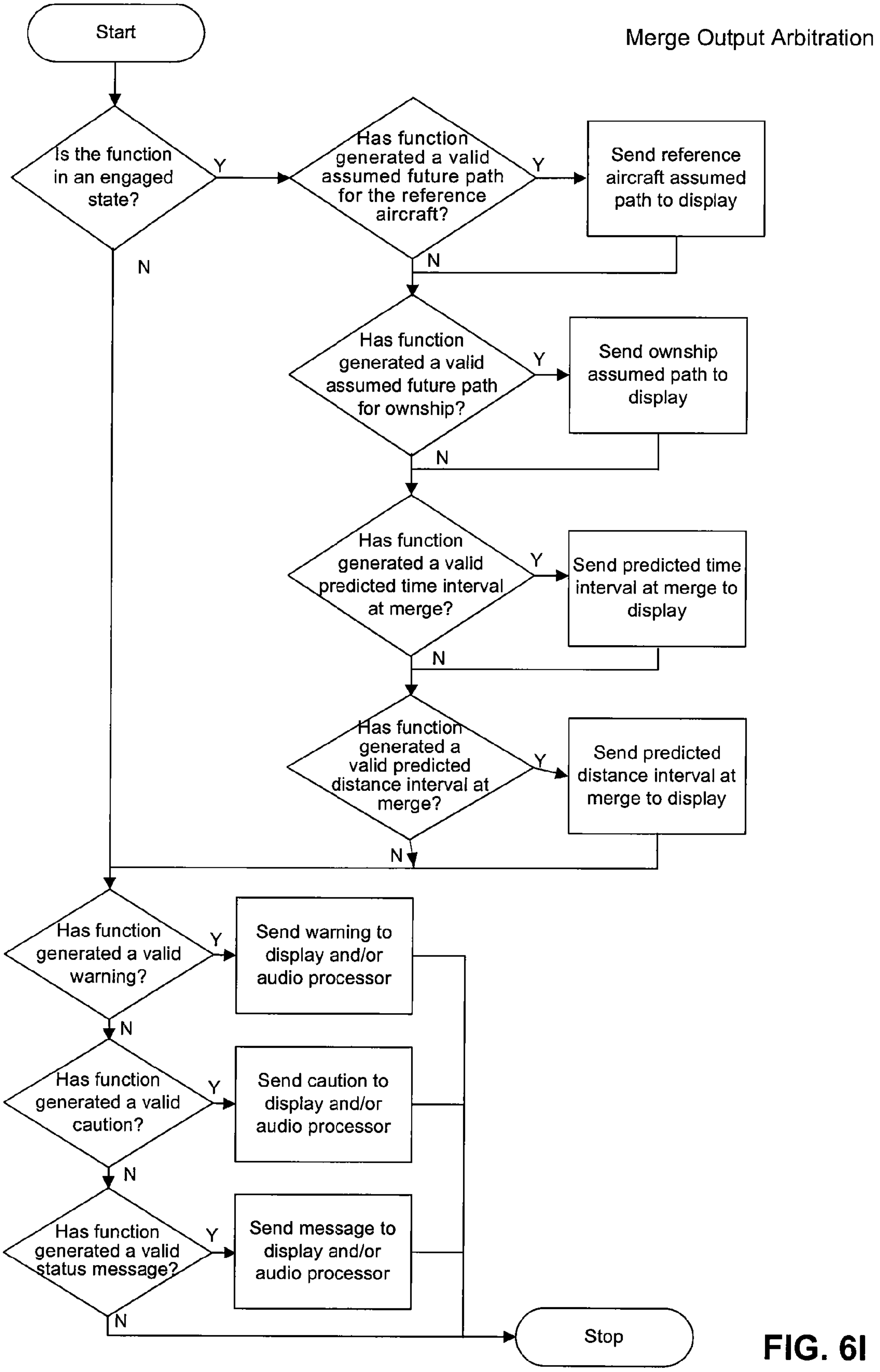
Figure 6J:
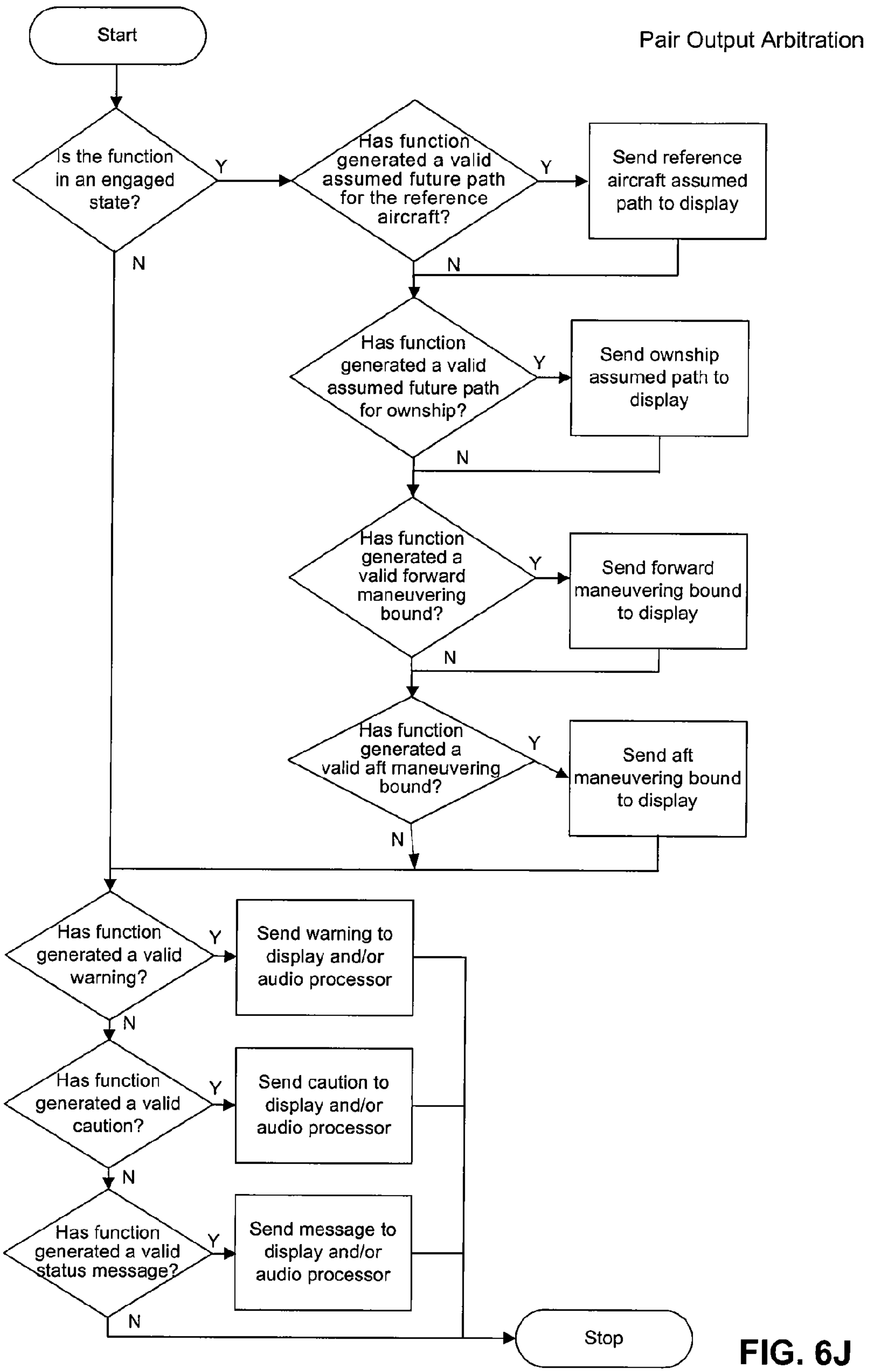
Figure 6K:
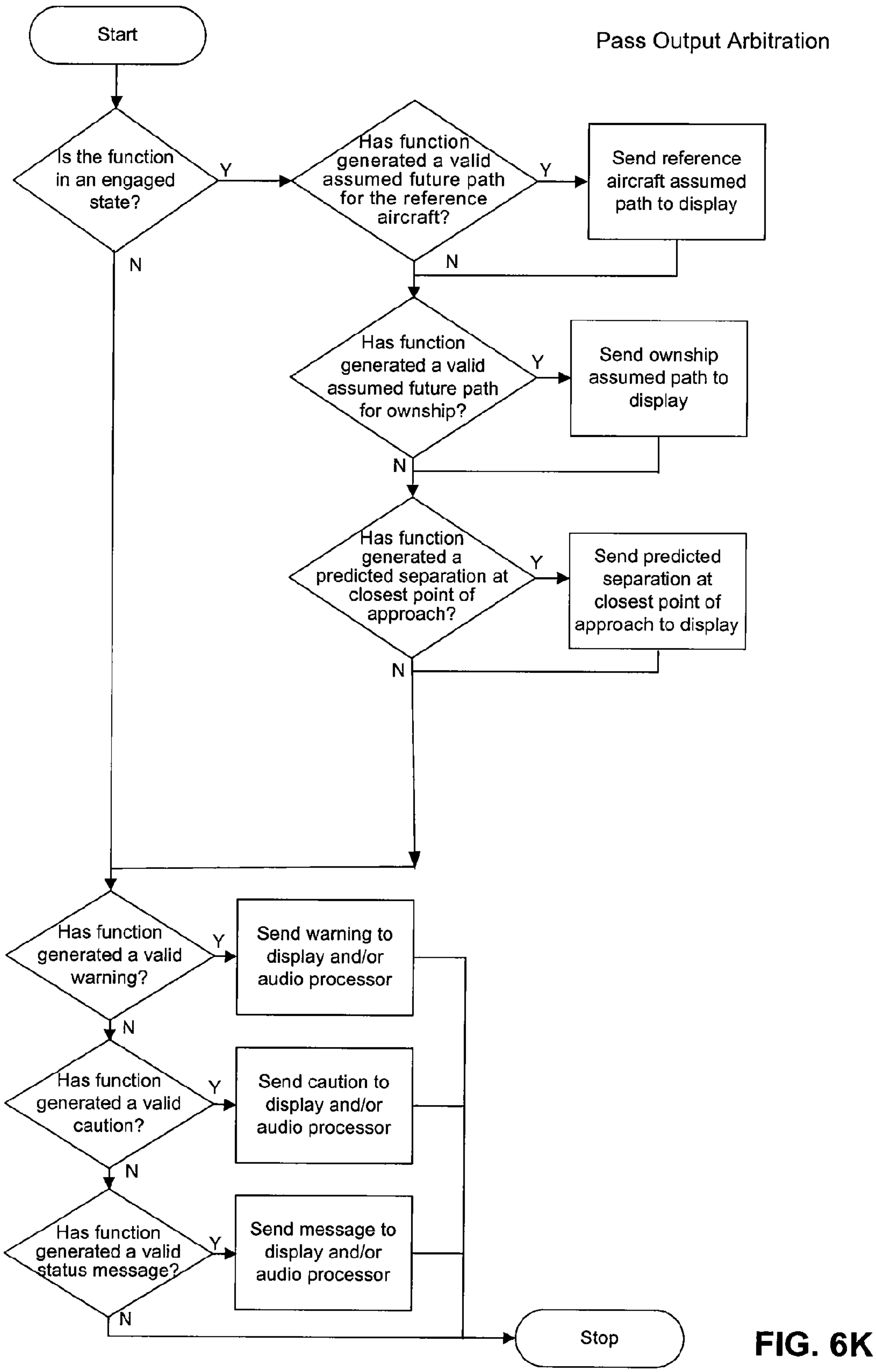
Figure 6L:
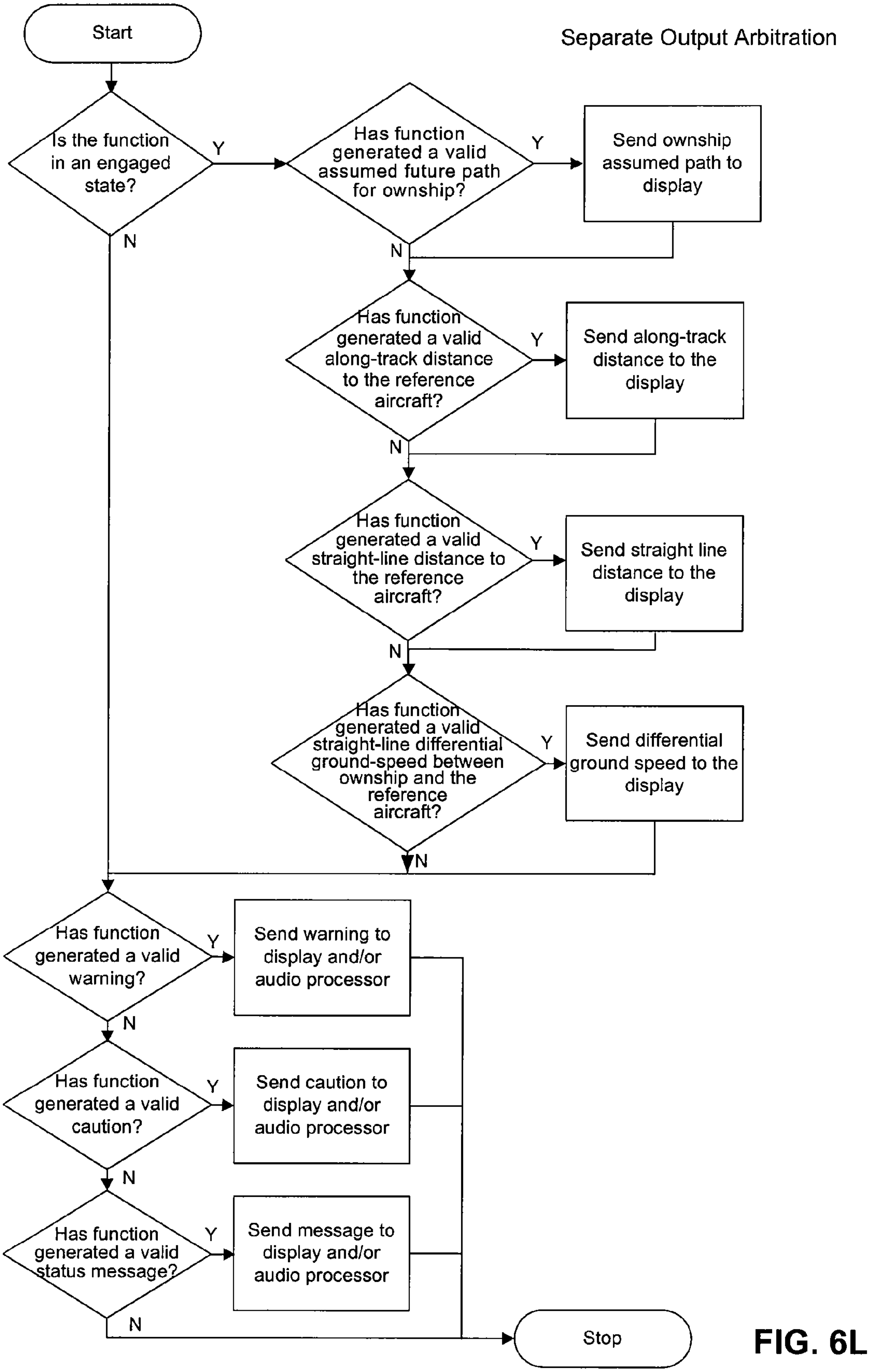
Figure 6M:
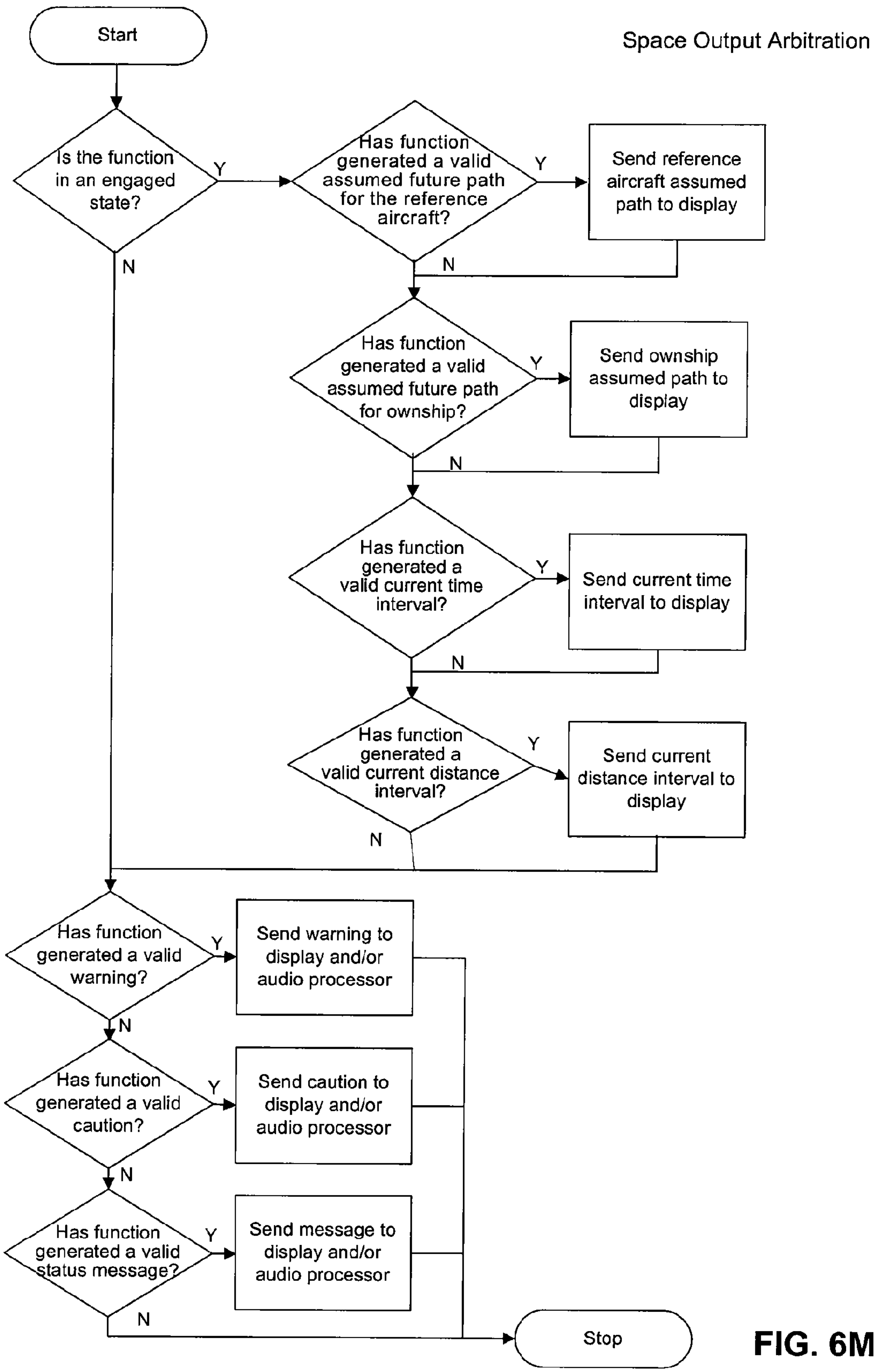
Figure 6N:
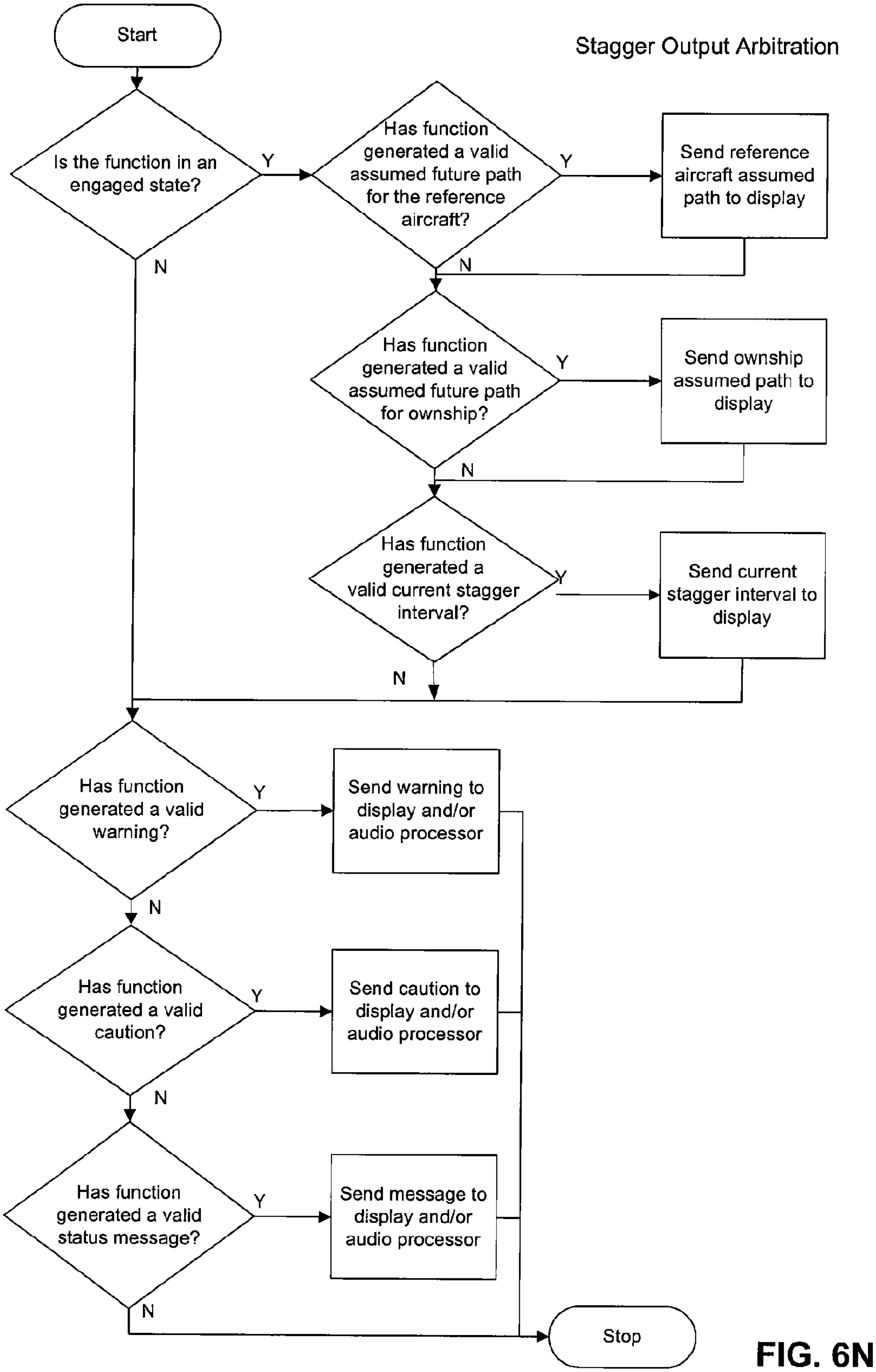
Figure 6O:
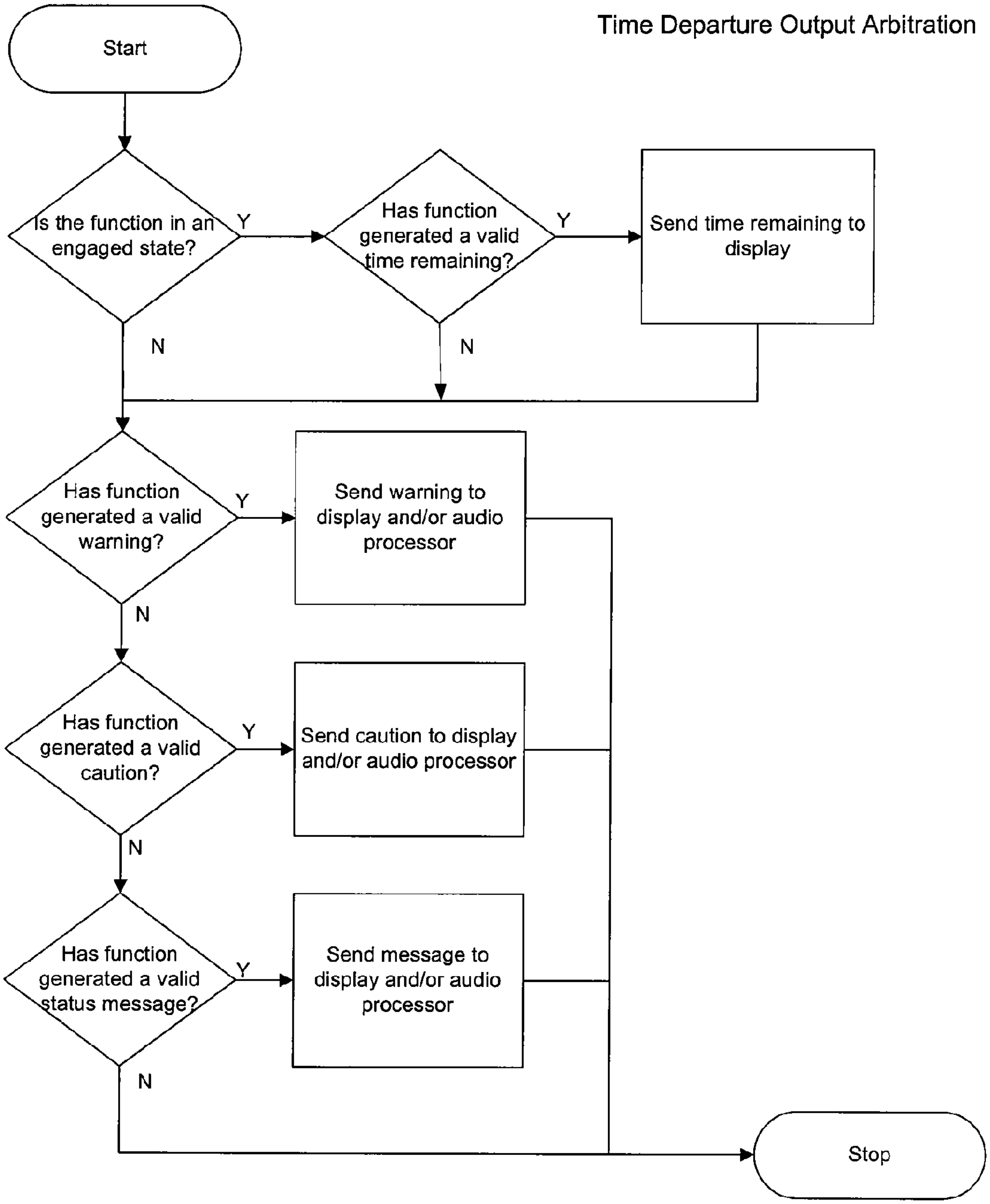

Picking up the flow at 540 in FIG. 5B, the embodiment described thereon systematically directs each engaged ADS-B function at steps 550A-M, to an output arbitration algorithm for each function. As shown in FIGS. 6A-6O different customized approaches may be used to arbitrate for each involved function. As shown in FIG. 5C, the flow returns at 570 to check for additional functions 575 on the function list. If functions remain available for selection from the function list, then the next function on the list 580 is selected for processing, and the process at 520 begins again, as directed by 590. If no function remains for processing on the function list, then embodiments will first check for a valid speed command 580A, then a valid vertical speed command 580B, then a valid heading command 580C. If any of the three commands are found and valid, they are forwarded (in 585A-C) to command processing logic or a display data processing system.

V. ALGORITHM SELECTION MODULE

As is known by those skilled in the art, avionics functions (e.g., ADS-B functions) perform tasks using one or more algorithms and, in some cases sub-algorithms. As used herein, algorithm and sub-algorithm are considered equivalent terms. Embodiments of the present invention may select the algorithm and sub algorithm used by the functions based on various criteria to be discussed below, including the status of Ownship, the status of different reference aircraft, proximity to ground features (e.g., airports), and other like criteria (e.g., restricted airspace). Once selecting the algorithms for a function, embodiments of the present invention will direct the function to utilize the selected algorithms, and monitor the results.

Figure 1B:
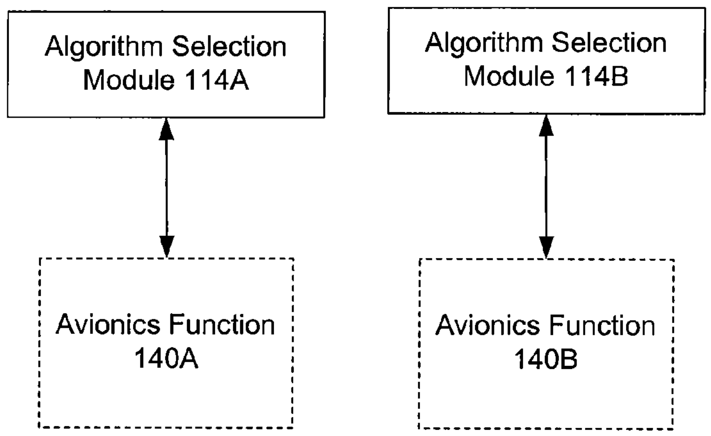
FIG. 1B depicts algorithm selection modules coupled to avionics functions, according to an embodiment of the present invention.
Figure 1C:
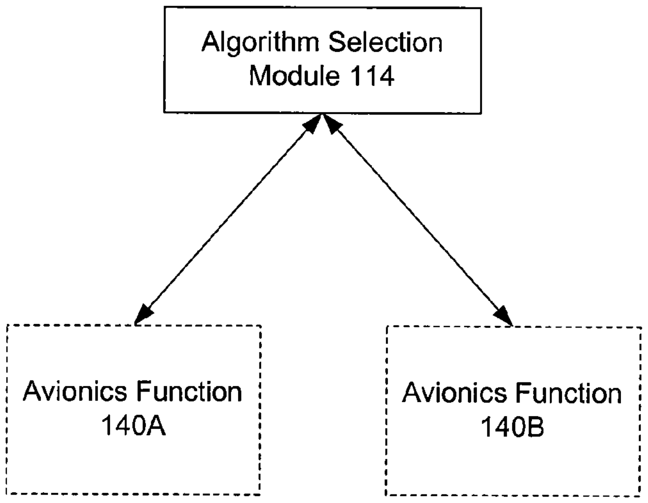
FIG. 1C depicts an algorithm selection module coupled to avionics functions, according to an embodiment of the present invention.

In one embodiment, as in FIG. 1B, each avionics function 140A-B has its own algorithm selection module 114A-B, e.g., the Follow function module is coupled to Follow algorithm selector module. In another embodiment, as in FIG. 1C, there are one or more centralized algorithm selector modules 114, each selecting algorithms for a plurality of avionics functions 140A-B.

Figure 7:
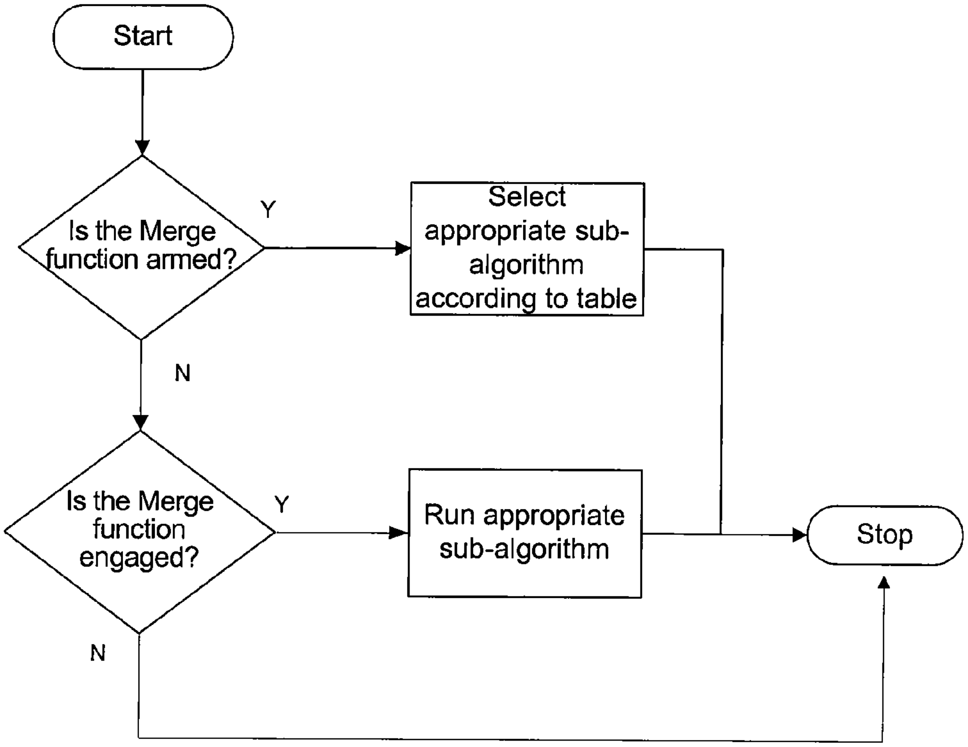
FIG. 7 depicts an algorithm selection process, according to embodiments of the present invention.

Turning to FIG. 7, an algorithm selection process is depicted for selecting a Merge algorithm. Step 710 begins the process by testing the current state (e.g., armed or engaged) of the Merge function. One skilled in the art, and familiar with the teachings herein will be able to apply the algorithm selection process herein described to other functions. As shown in step 715, the sub-algorithm selection takes place at the time a function is armed. In the embodiment described by FIG. 7, once a function is enabled, a sub-algorithm has already been, if possible, selected (steps 720, 725). As referenced in step 715, Table 2, shown below, may be used by embodiments of the algorithm selection module 114 to select from a plurality of merge algorithms (step 715). One skilled in the art would appreciate that other criteria may apply to other functions, and the teachings herein allow the application of the described logic to additional circumstances.

A1. Has a merge fix been specified? The merge fix is generally an optional parameter for the ADS-B merge function. Embodiments may also consider other types of external data. As an example, not intended to limit the invention, a merge clearance could satisfy this merge fix condition, and could be transmitted to the aircraft via a digital or analog communication and then forwarded for consideration by embodiments. This is only one of the areas where this type of information could be useful to embodiments.

Figure 4:
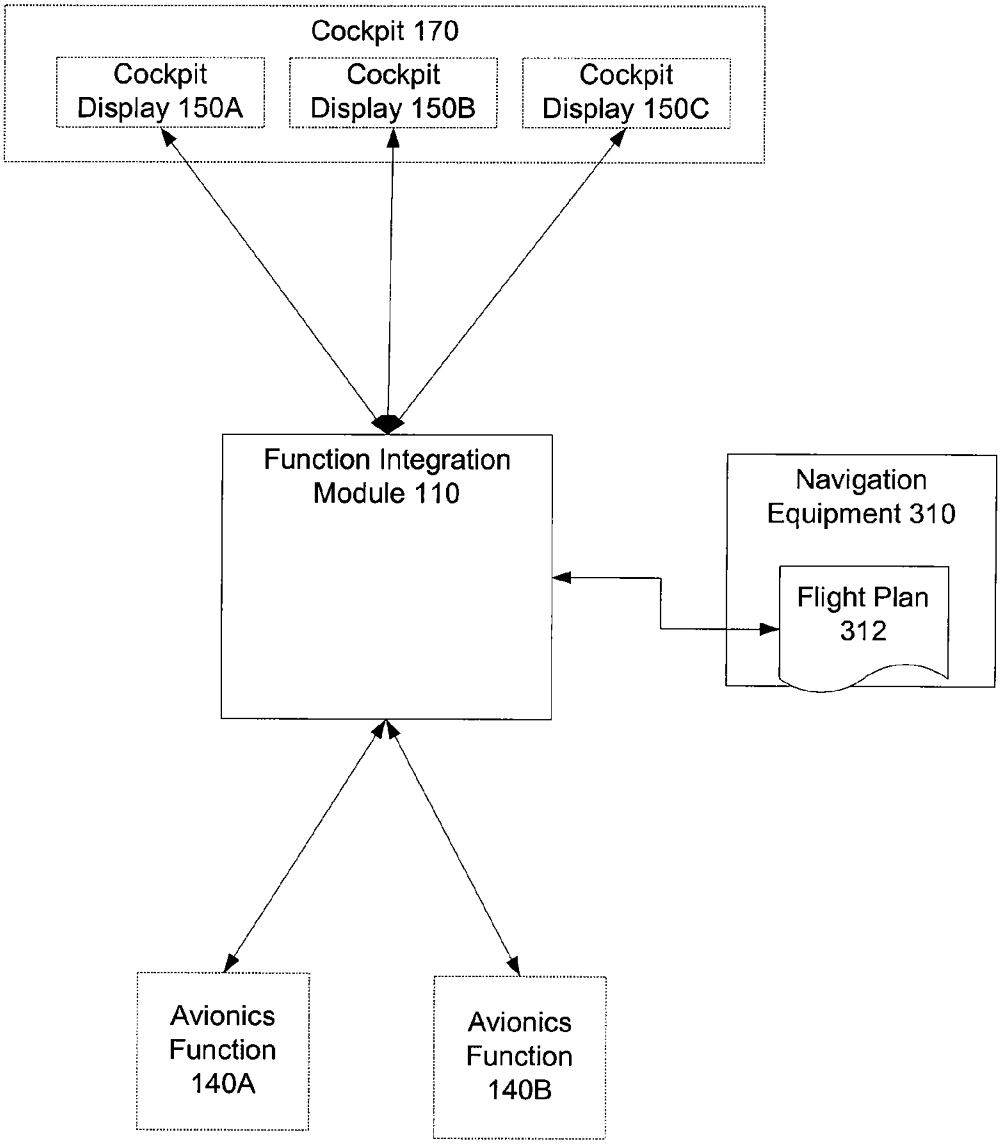
FIG. 4 depicts a system to integrate avionics functions coupled to navigation equipment, according to embodiments of the present invention.

A2. Does Ownship's flight plan contain the merge fix? FIG. 4 shows an embodiment where function integration module 110 is coupled to Ownship's navigation equipment 310. Access to flight plan 312 contained in this navigation equipment 310 could provide additional information to be considered by embodiments for this and other conditions.

A3. Is the reference aircraft's flight plan available? Flight plan information for reference aircraft may or may not be available to embodiments. Different approaches to obtaining flight plans from other aircraft include: deriving from ADS-B intent data, receiving from directed ATC data communication, or from manual entry by a user. For that portion subsequent to the merge point, the assumption that the reference aircraft will follow the same path as own ship could also be used in embodiments. As with all of the rules examples herein, this example is illustrative and not intended to limit the invention.

A4. Does the reference aircraft's flight plan contain the merge fix? If a merge fix has been specified and flight plan data for the reference aircraft is available, that flight plan data may be searched to obtain the merge fix.

A5. Is Ownship conforming to its flight plan? In embodiments, this consideration tests whether or not Ownship is flying in reasonable proximity to the flight plan that function integration module 110 may assume it will follow. Tolerances can be varied to fit operating environment and speeds. Additionally, in assessing this A4 condition, embodiments may also test the configuration of the aircraft's autoflight system to determine whether the crew is receiving guidance from the Autoflight system to assist with following the flight plan.

A6. Is the reference aircraft conforming to its plan? Similar to consideration A5 above, this consideration tests whether or not the reference aircraft is flying in reasonable proximity to the flight plan the function integration module 110 assumes it will follow. Tolerances can be varied to fit operating environment and speeds. Embodiments could utilize and consider data from reference aircraft autoflight systems if it is available.

A7. Has a merge interval been specified? The merge interval is generally an optional parameter for the merge ADS-B function. When no merge interval is given, one implementation of the merge function by embodiments attempts to merge Ownship behind the reference aircraft by a default interval.

A8. Is interval to be achieved at the runway threshold? The integration of advanced merging and spacing algorithms by embodiments may increase a user's ability to achieve a desired interval at the runway threshold. One skilled in the art familiar with teachings herein will appreciate that embodiments may seek to ensure that the minimum default interval described above followed at the merge point—and at all points thereafter—while achieving the desired interval at the threshold. The integration structure taught herein allows for alternate approaches to different situations. Embodiments assessing the conditions A1-A9 may have information corresponding to ground features, e.g., airports, this data being received, for example by Global Positioning System (GPS) systems in Ownship, or other methods known in the art.

A9. Is flight plan data through landing for both aircraft known? As discussed above, this specific flight plan data associated with landing, as with any flight plan data for Ownship and reference aircraft, may or may not be available for consideration. Evaluating conditions such as A1-A9 may be performed with data corresponding to the current phase of the flight, e.g., takeoff phase or landing phase. This example of considerations A1-A9 is illustrative and not intended to limit the invention. As would be apparent to a person skilled in the art given these teachings, different descriptions, criteria, characteristics and features may be used as factors to assist in the selection of function algorithms. In addition, one skilled in the art could use these teachings to design algorithm selection factors for other functions as well.

In the following matrix, each one of the example conditions A1-A9 have been placed in a matrix, along with their (Y/N) values. In embodiments, another version of this example matrix would have 512 rows (i.e., $2^{\wedge}9^{th}$ power), based on the two values (Y/N) and the nine conditions. The matrix displayed below only displays the rows which direct to a sub-algorithm, i.e., it omits rows that do not correspond to a sub-algorithm selection.

TABLE 2

Sample Algorithm Matrix

| Condition | A1 | A2 | A3 | A4 | A5 | A6 | A7 | A8 | A9 | Sub-Algorithm |
|---|---|---|---|---|---|---|---|---|---|---|
| 1 | N | N | N | N | N | N | N | N | N | 1 |
| 5 | N | N | N | N | N | N | Y | N | N | 2 |
| 17 | N | N | N | N | Y | N | N | N | N | 3 |
| 21 | N | N | N | N | Y | N | Y | N | N | 4 |
| 73 | N | N | Y | N | N | Y | N | N | N | 5 |
| 74 | N | N | Y | N | N | Y | N | N | Y | 5 |
| 77 | N | N | Y | N | N | Y | Y | N | N | 6 |
| 78 | N | N | Y | N | N | Y | Y | N | Y | 6 |
| 89 | N | N | Y | N | Y | Y | N | N | N | 7 |
| 90 | N | N | Y | N | Y | Y | N | N | Y | 7 |
| 93 | N | N | Y | N | Y | Y | Y | N | N | 8 |
| 94 | N | N | Y | N | Y | Y | Y | N | Y | 8 |
| 96 | N | N | Y | N | Y | Y | Y | Y | Y | 9 |
| 385 | Y | Y | N | N | N | N | N | N | N | 10 |
| 389 | Y | Y | N | N | N | N | Y | N | N | 11 |
| 401 | Y | Y | N | N | Y | N | N | N | N | 12 |
| 405 | Y | Y | N | N | Y | N | Y | N | N | 13 |
| 489 | Y | Y | Y | Y | N | Y | N | N | N | 14 |
| 490 | Y | Y | Y | Y | N | Y | N | N | Y | 14 |

TABLE 2-continued

Sample Algorithm Matrix

| Condition | A1 | A2 | A3 | A4 | A5 | A6 | A7 | A8 | A9 | Sub-Algorithm |
|---|---|---|---|---|---|---|---|---|---|---|
| 493 | Y | Y | Y | Y | N | Y | Y | N | N | 15 |
| 494 | Y | Y | Y | Y | N | Y | Y | N | Y | 15 |
| 505 | Y | Y | Y | Y | Y | Y | N | N | N | 16 |
| 506 | Y | Y | Y | Y | Y | Y | N | N | Y | 16 |
| 509 | Y | Y | Y | Y | Y | Y | Y | N | N | 17 |
| 510 | Y | Y | Y | Y | Y | Y | Y | N | Y | 17 |
| 512 | Y | Y | Y | Y | Y | Y | Y | Y | Y | 18 |

Embodiments assess the responses to example questions A1-A9 against Table 2 above, and a corresponding sub-algorithm may or may not be indicated. For example, as indicated by ROW #1, (N, N, N, N, N, N, N, N, N) answers for A1-A9, would indicate that sub-algorithm #1 should be used, this sub-algorithm depicted for illustrative purposes on FIG. 8A. Changing the above answer set to include a "Y" answer for A9, would lead to a lack of a selected sub-algorithm-because that combination does not appear on Table 2 above.

Figure 8A:
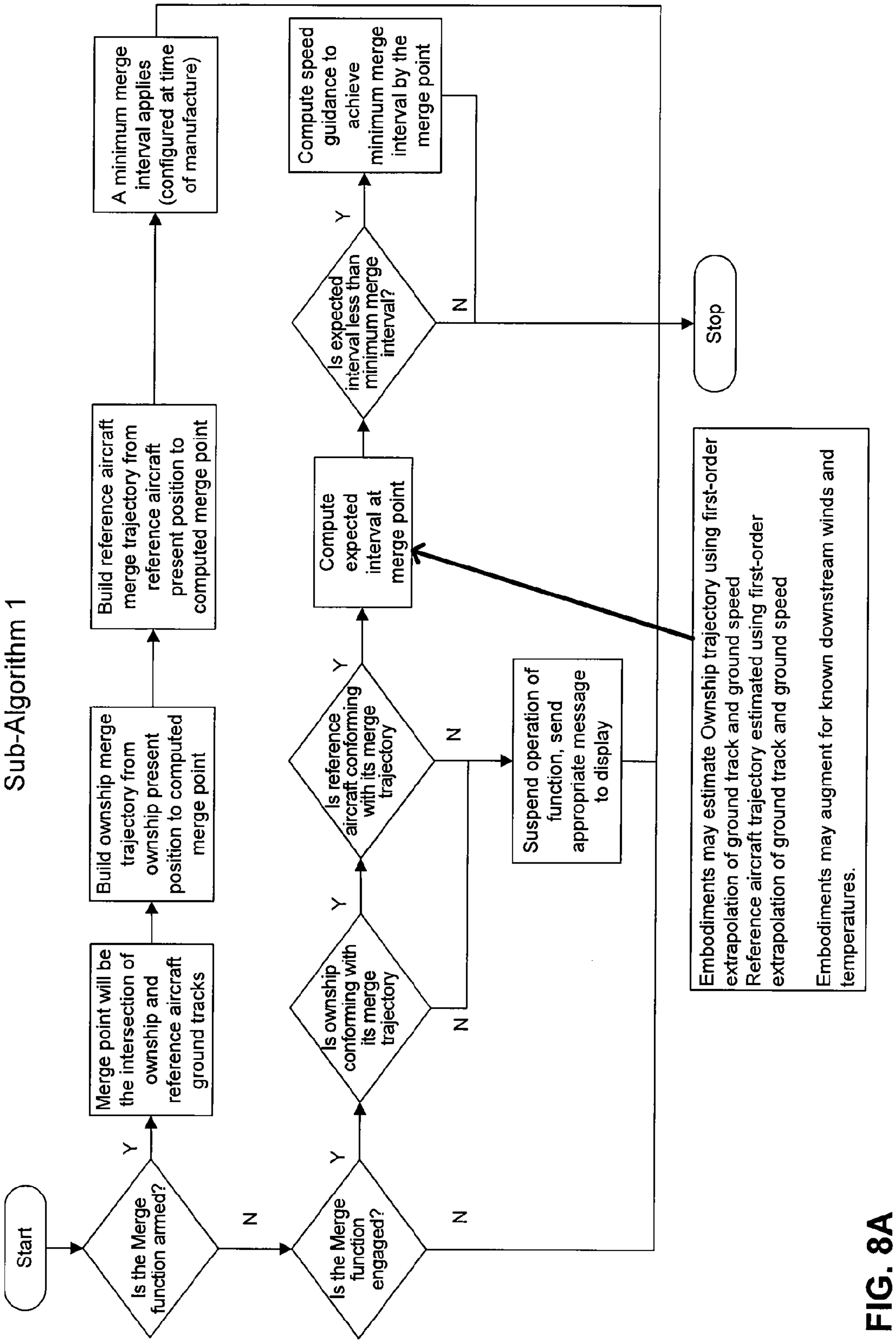
FIG. 8A-8R depict sample sub-algorithm processes, according to embodiments of the present invention.
Figure 8B:
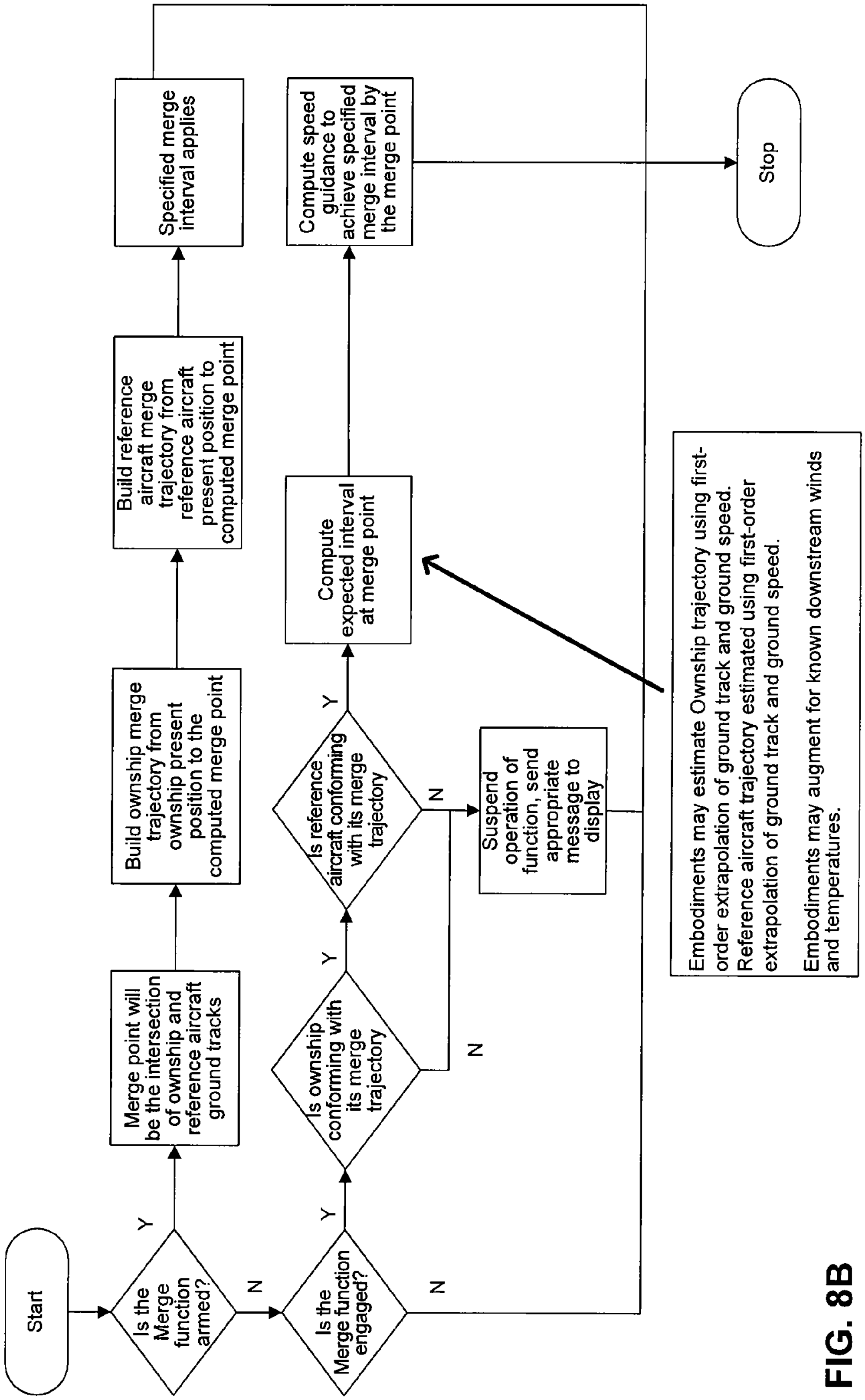
Figure 8C:
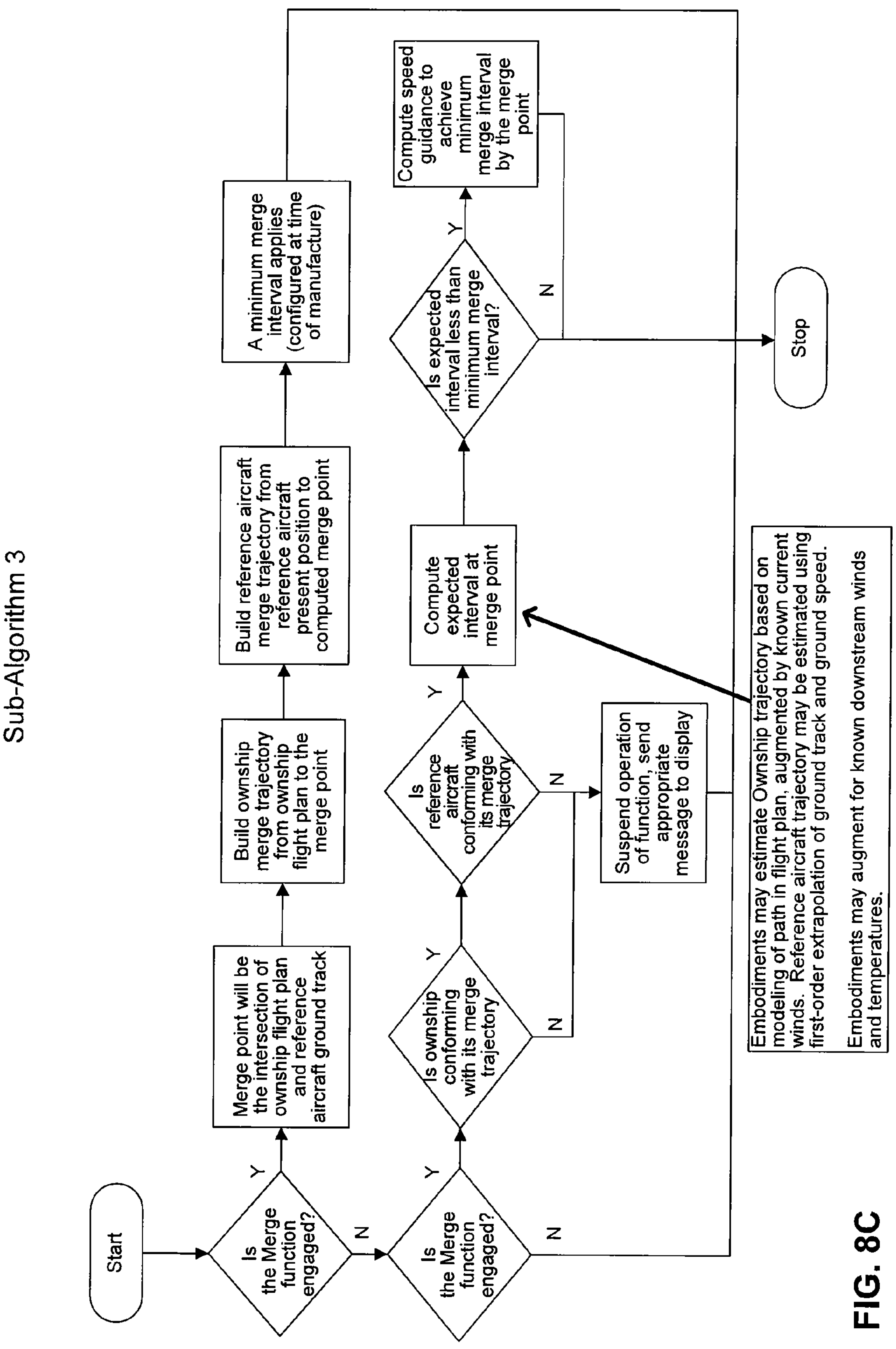
Figure 8D:
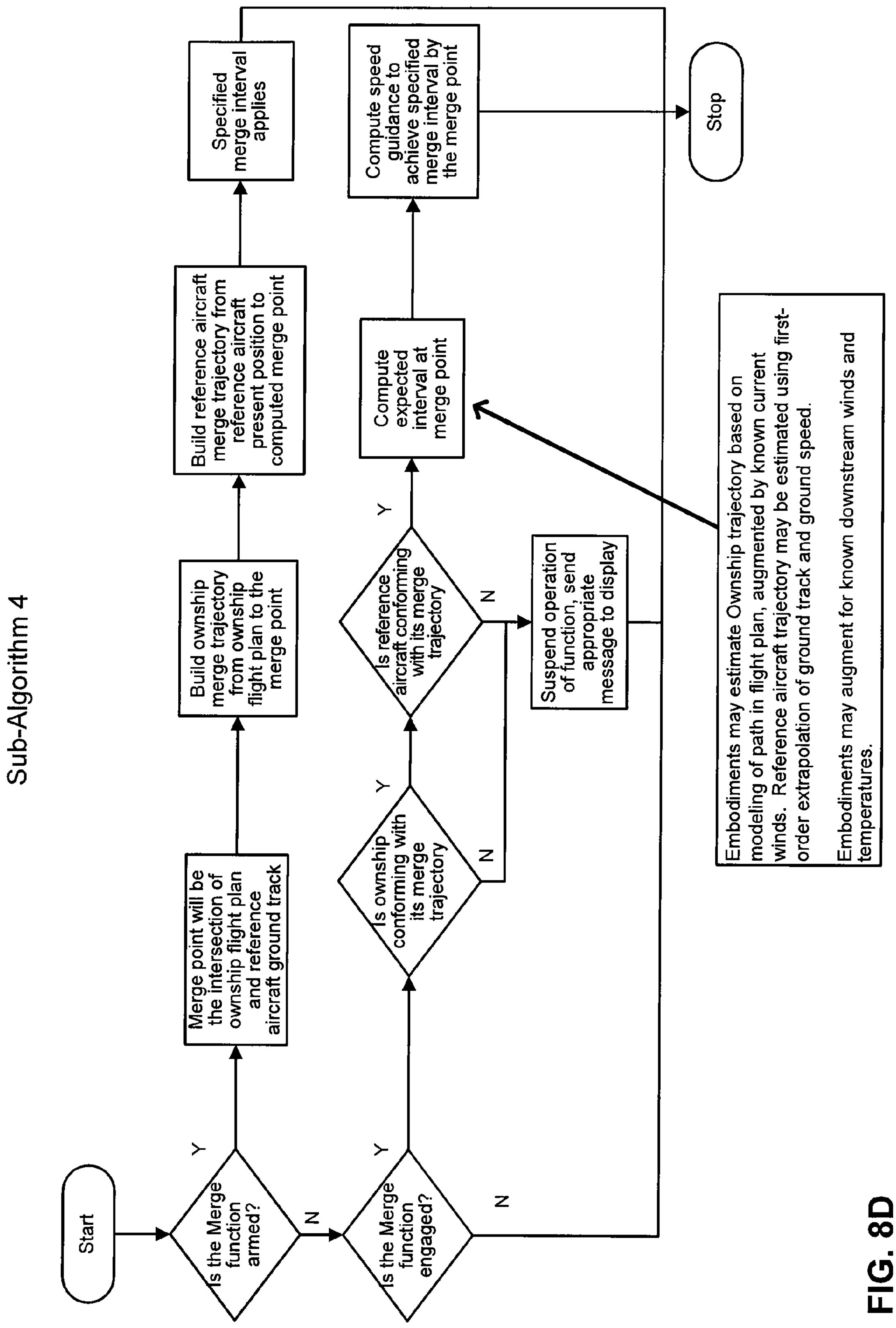
Figure 8E:
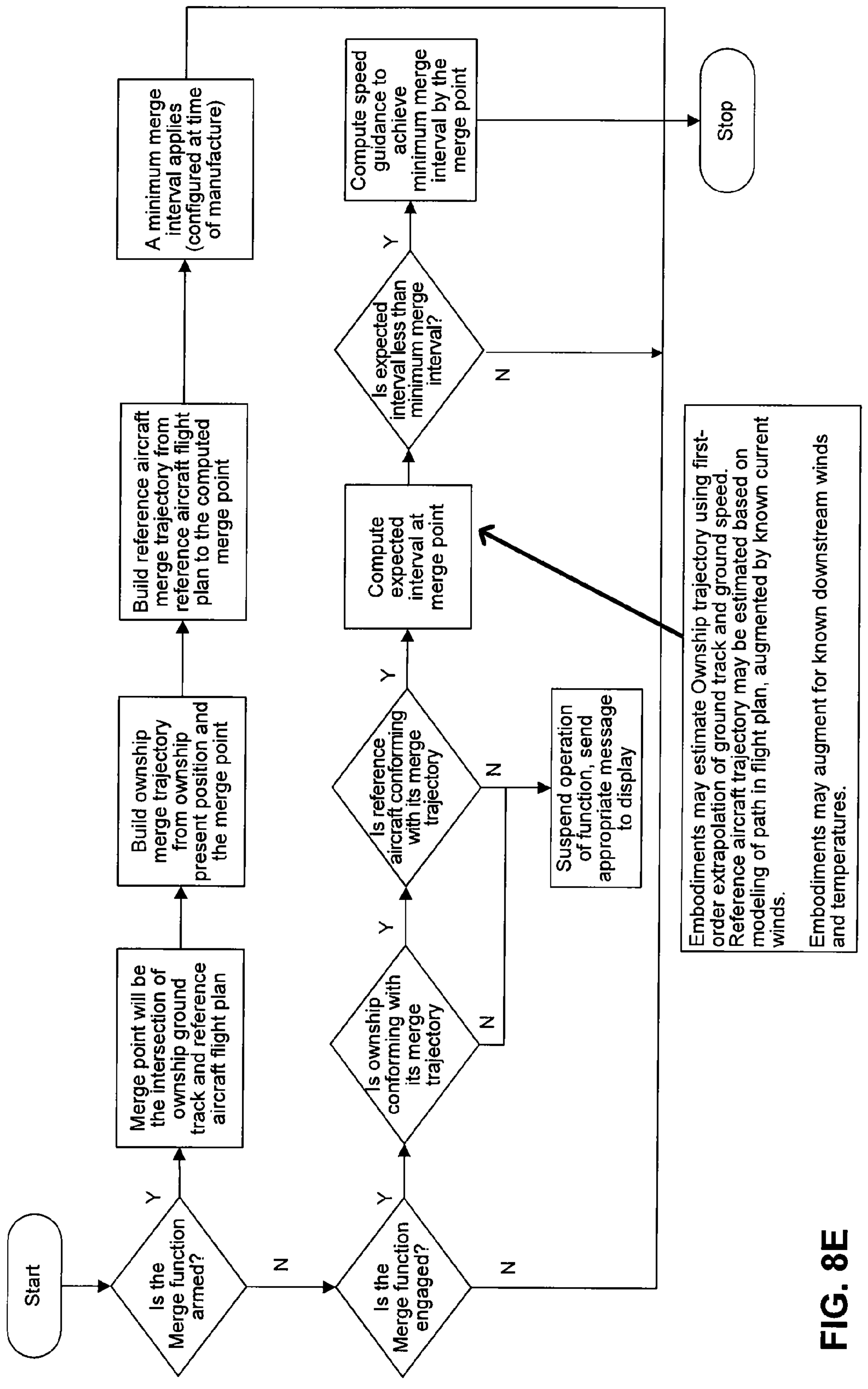
Figure 8F:
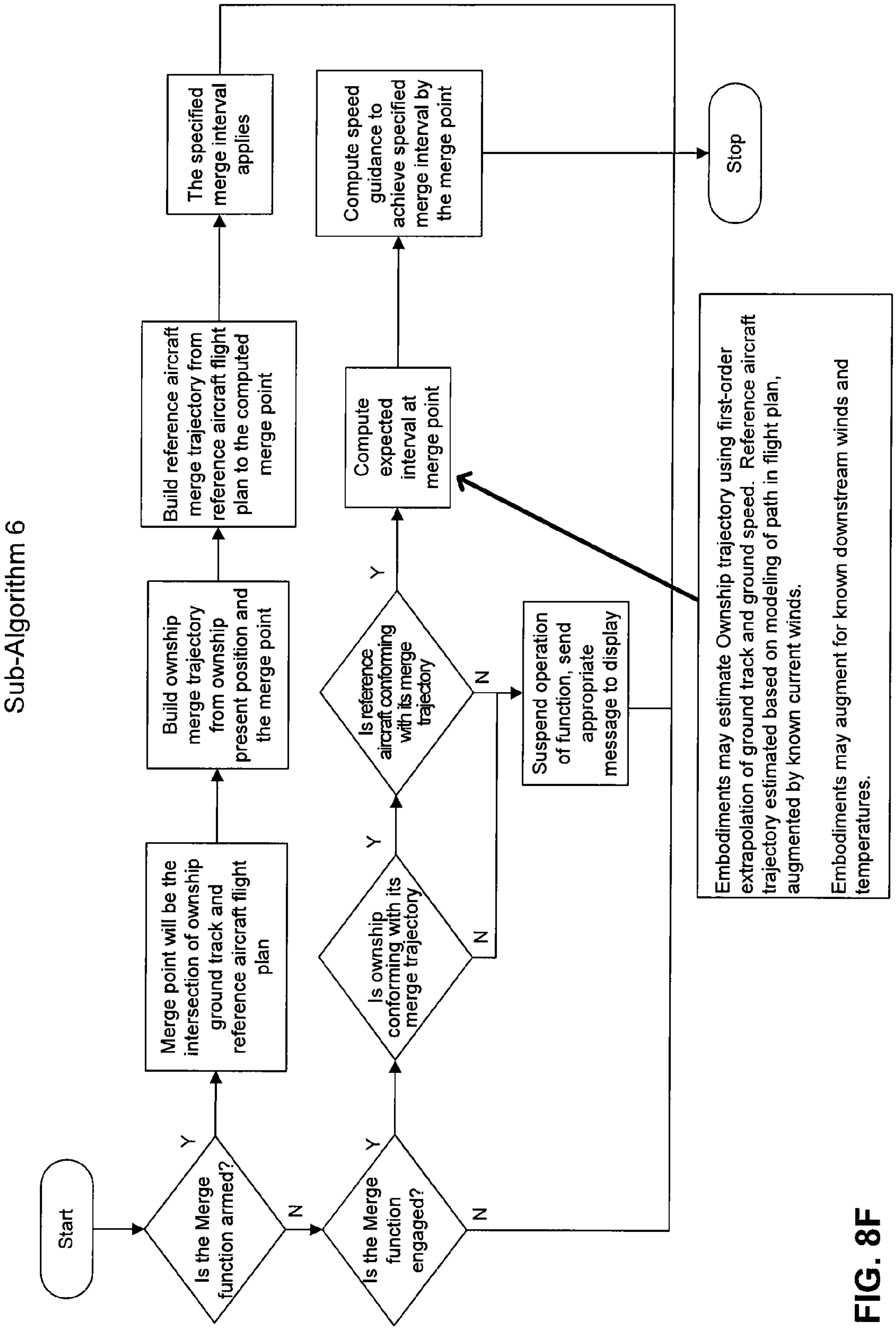
Figure 8G:
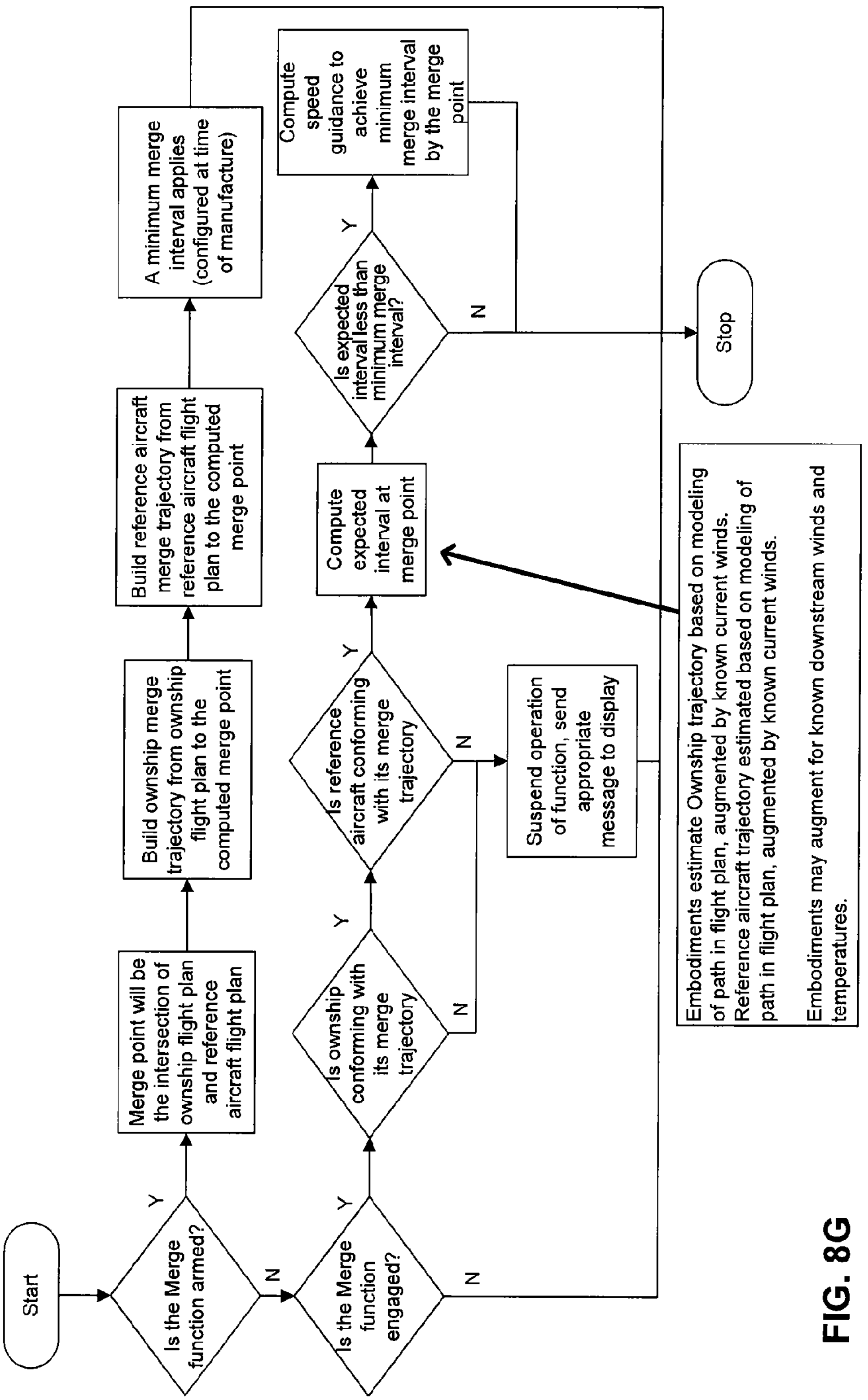
Figure 8H:
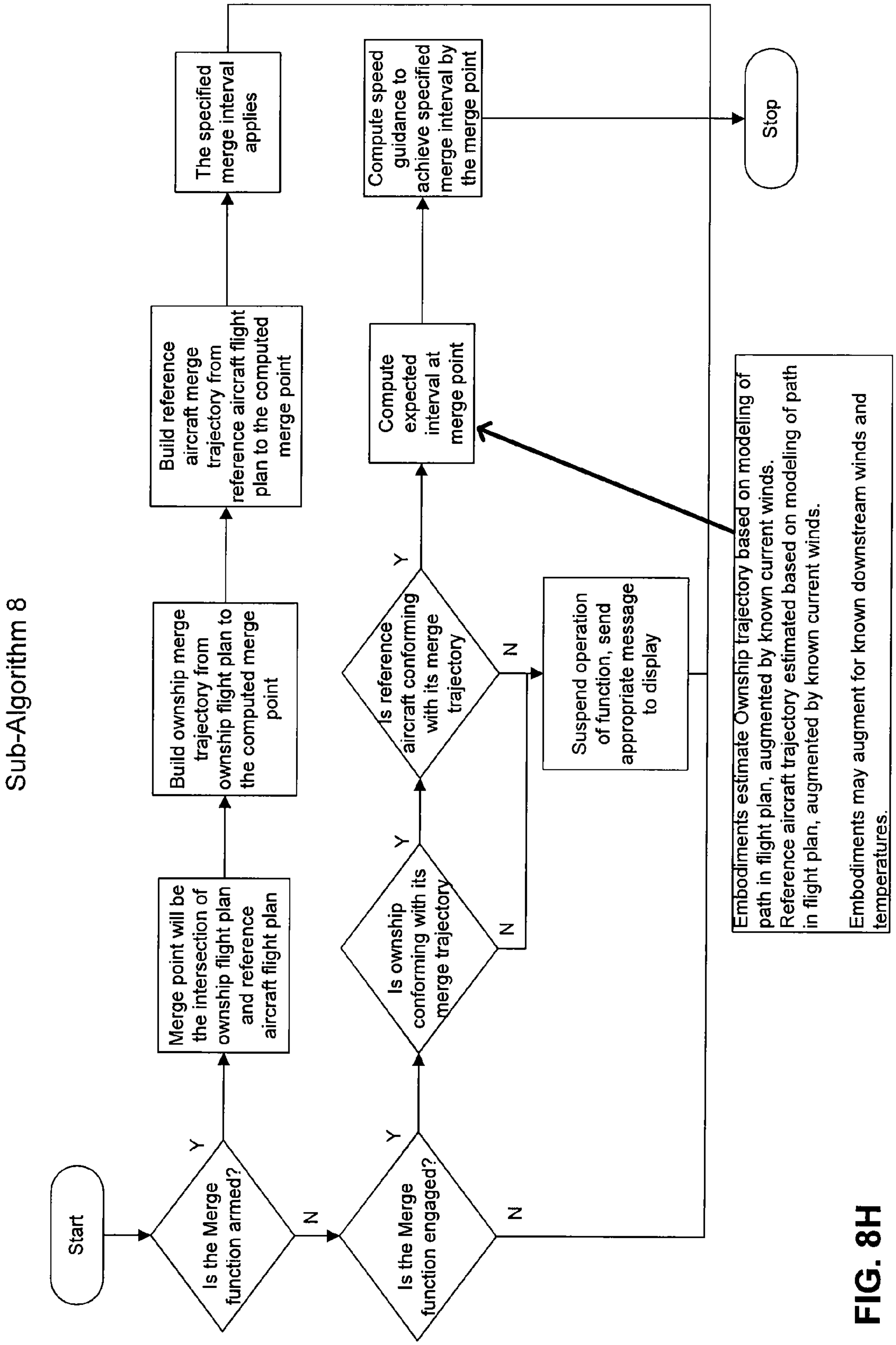
Figure 8I:
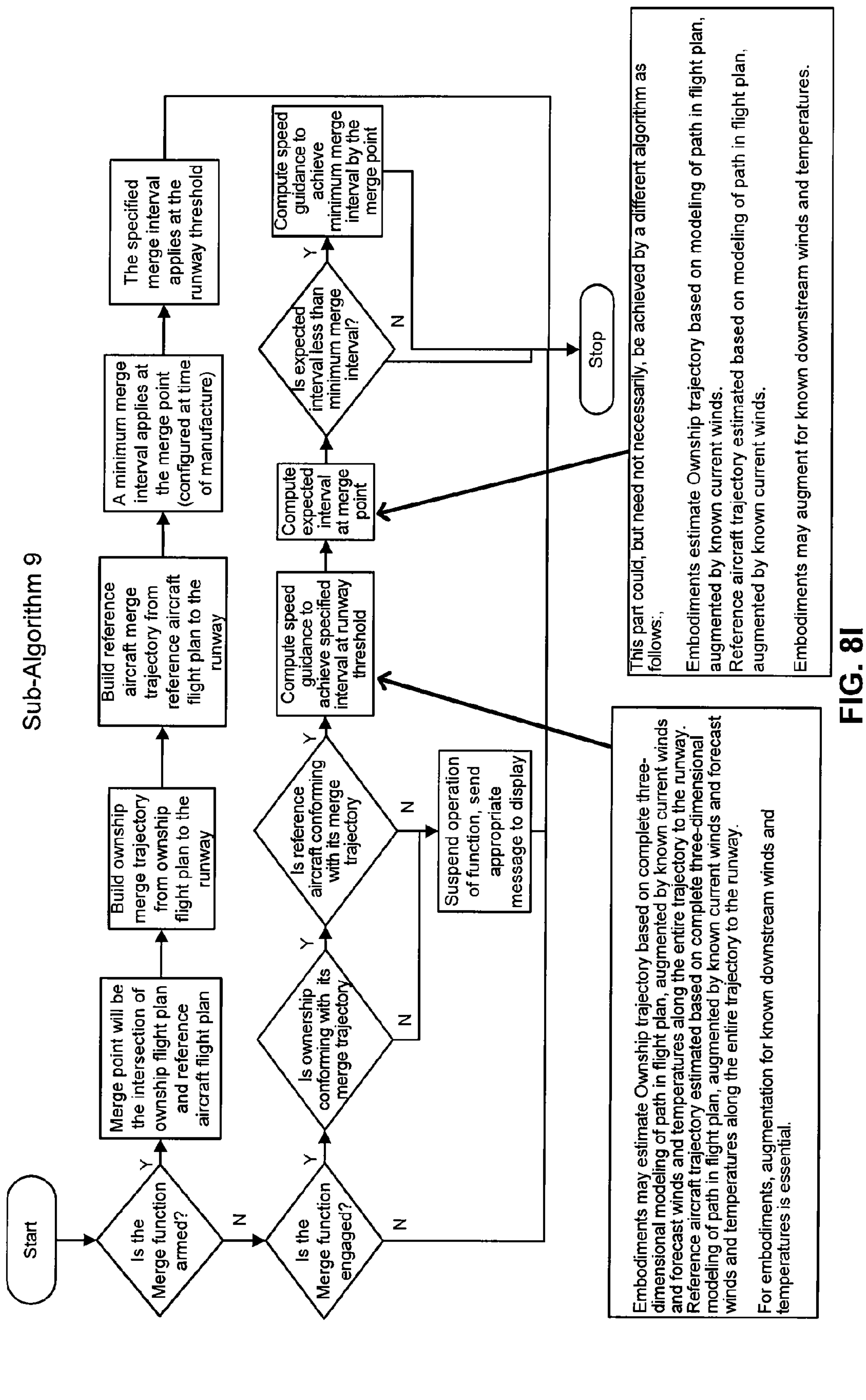
Figure 8J:
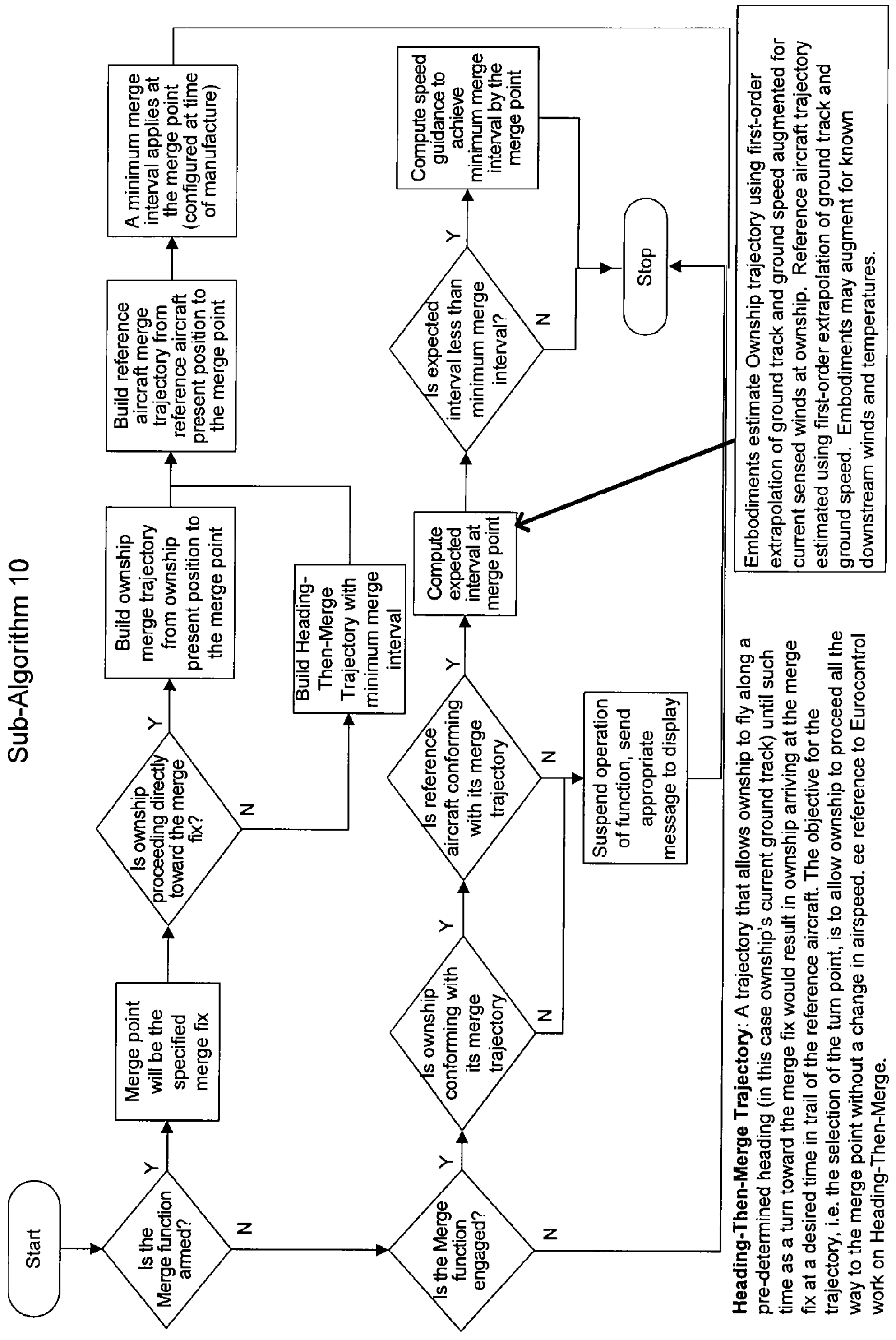
Figure 8K:
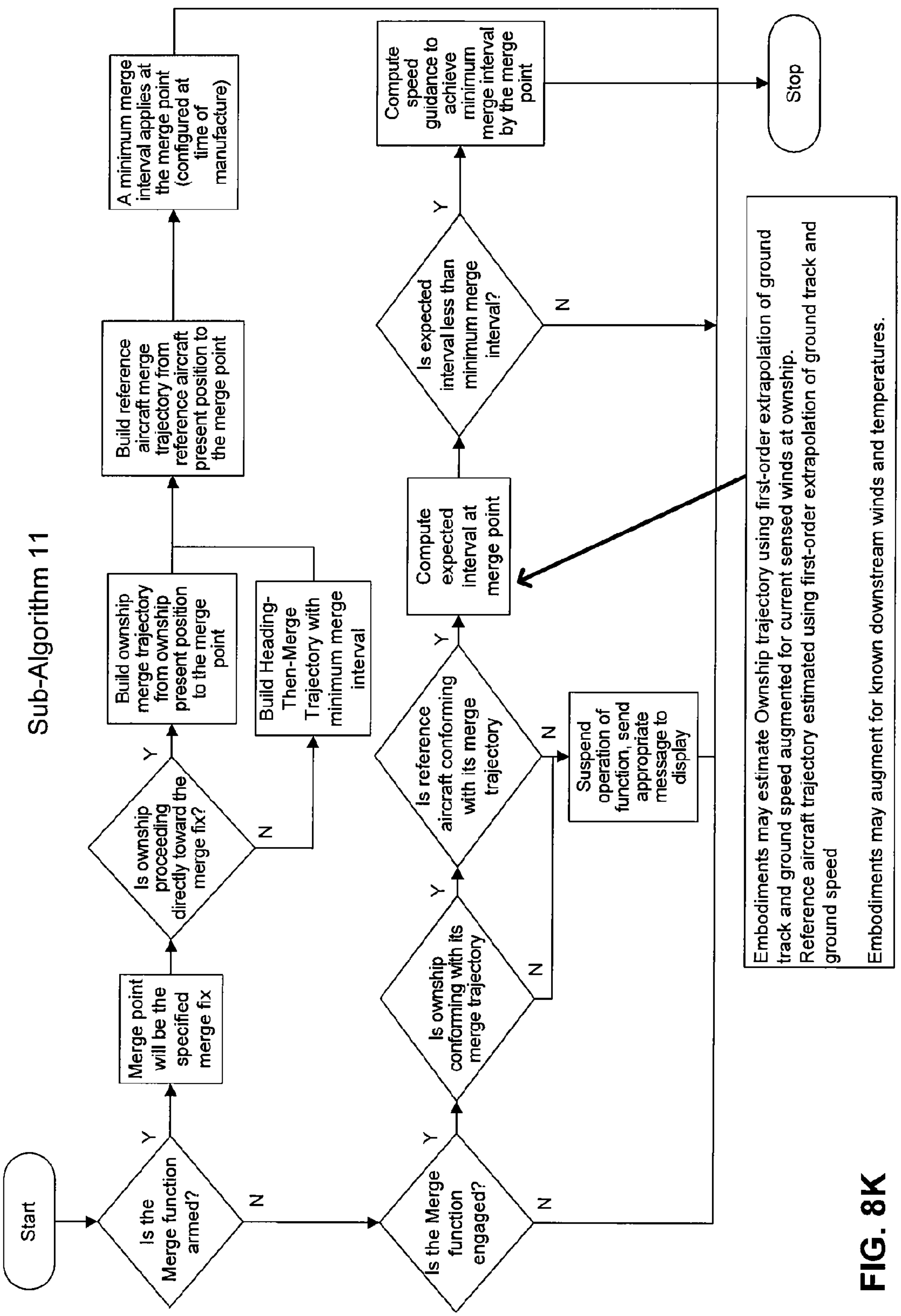
Figure 8L:
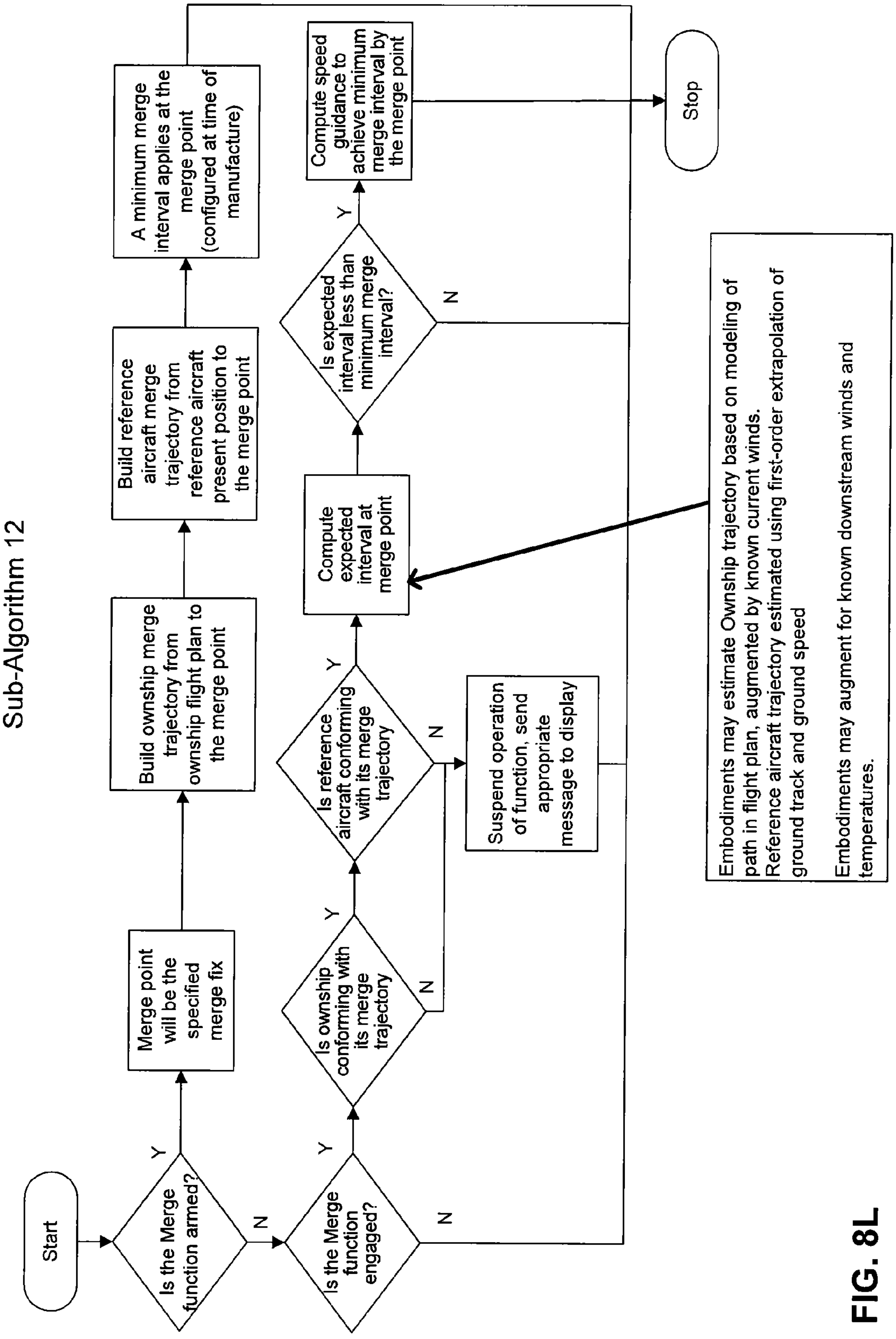
Figure 8M:
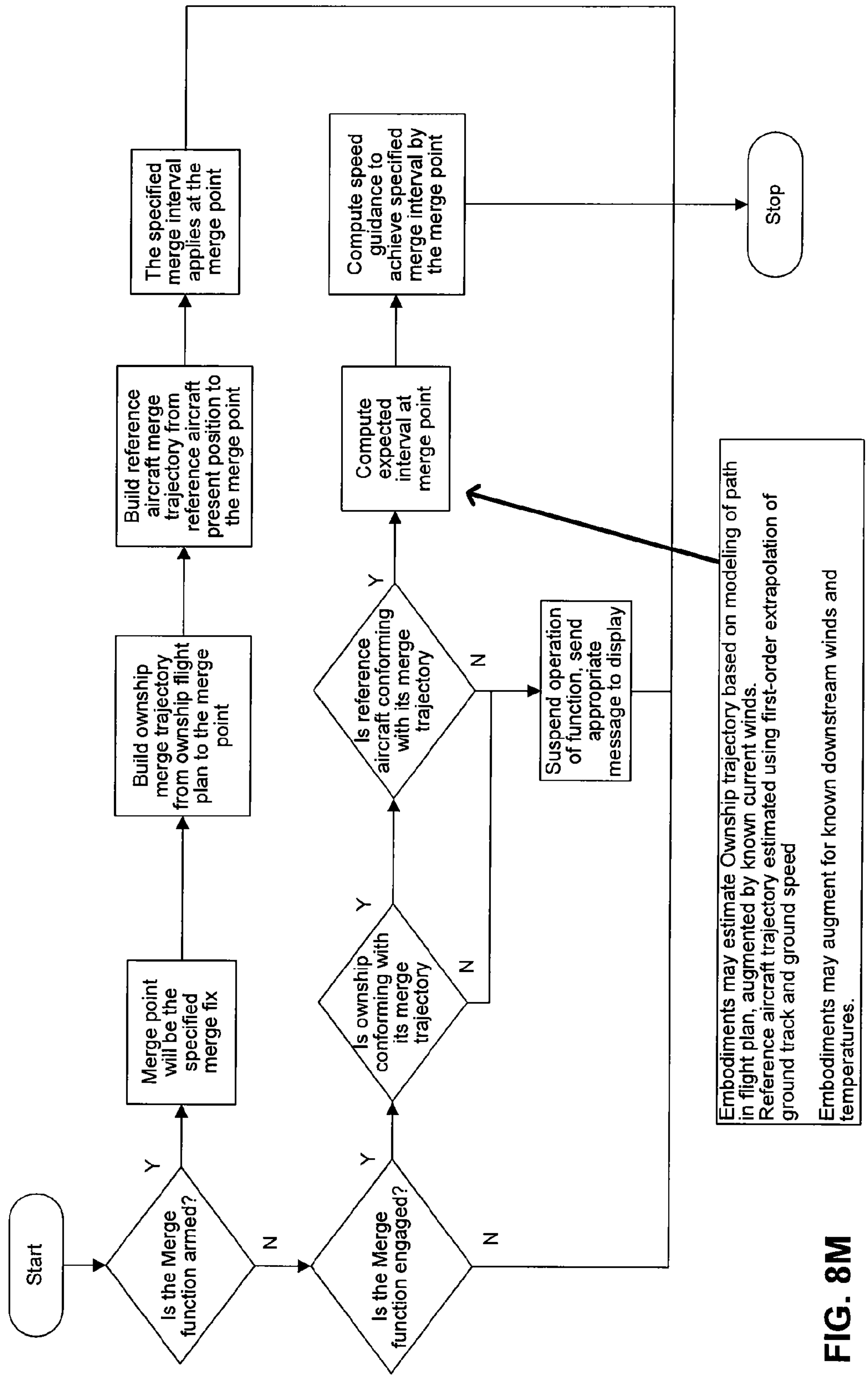
Figure 8N:
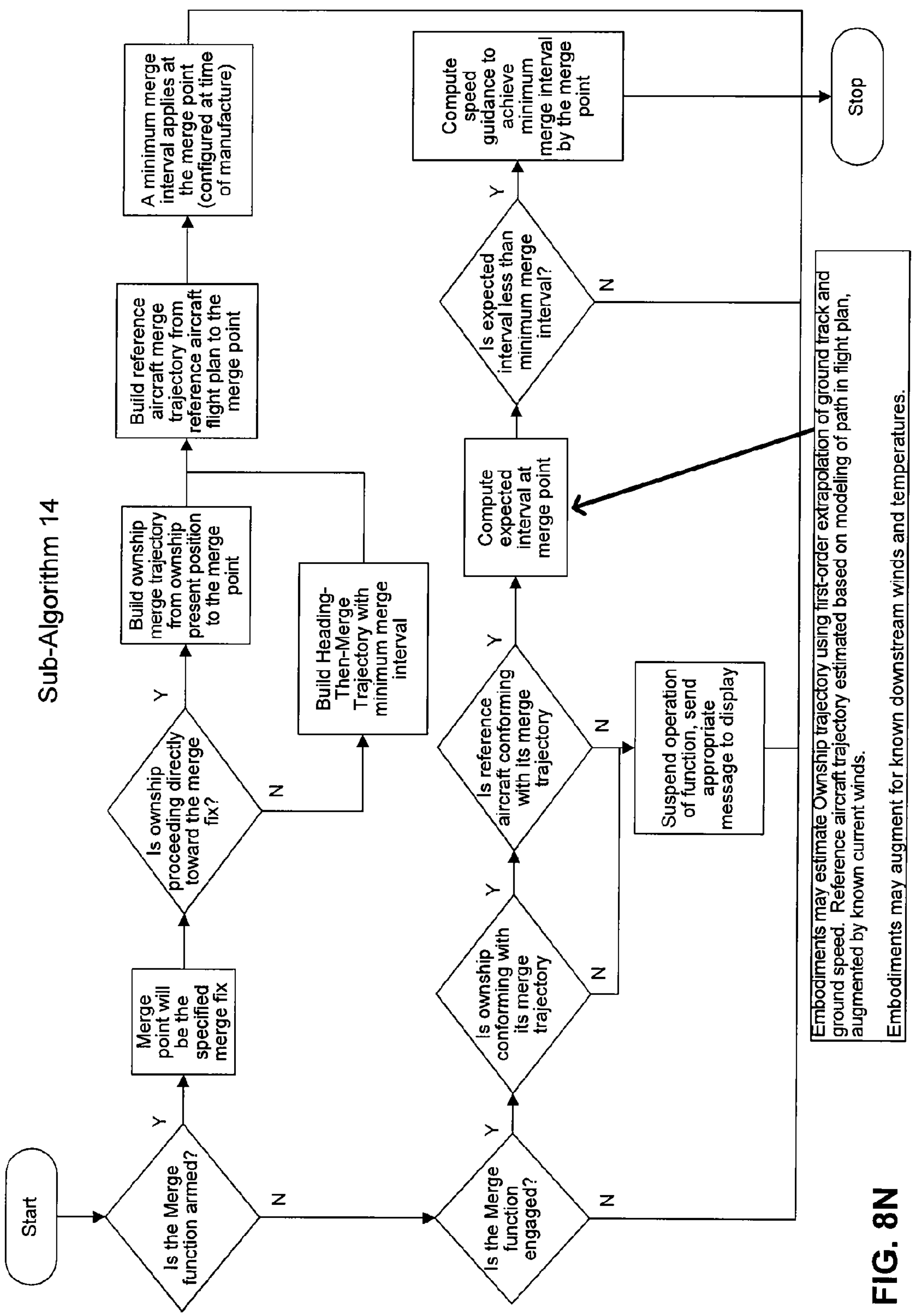
Figure 8O:
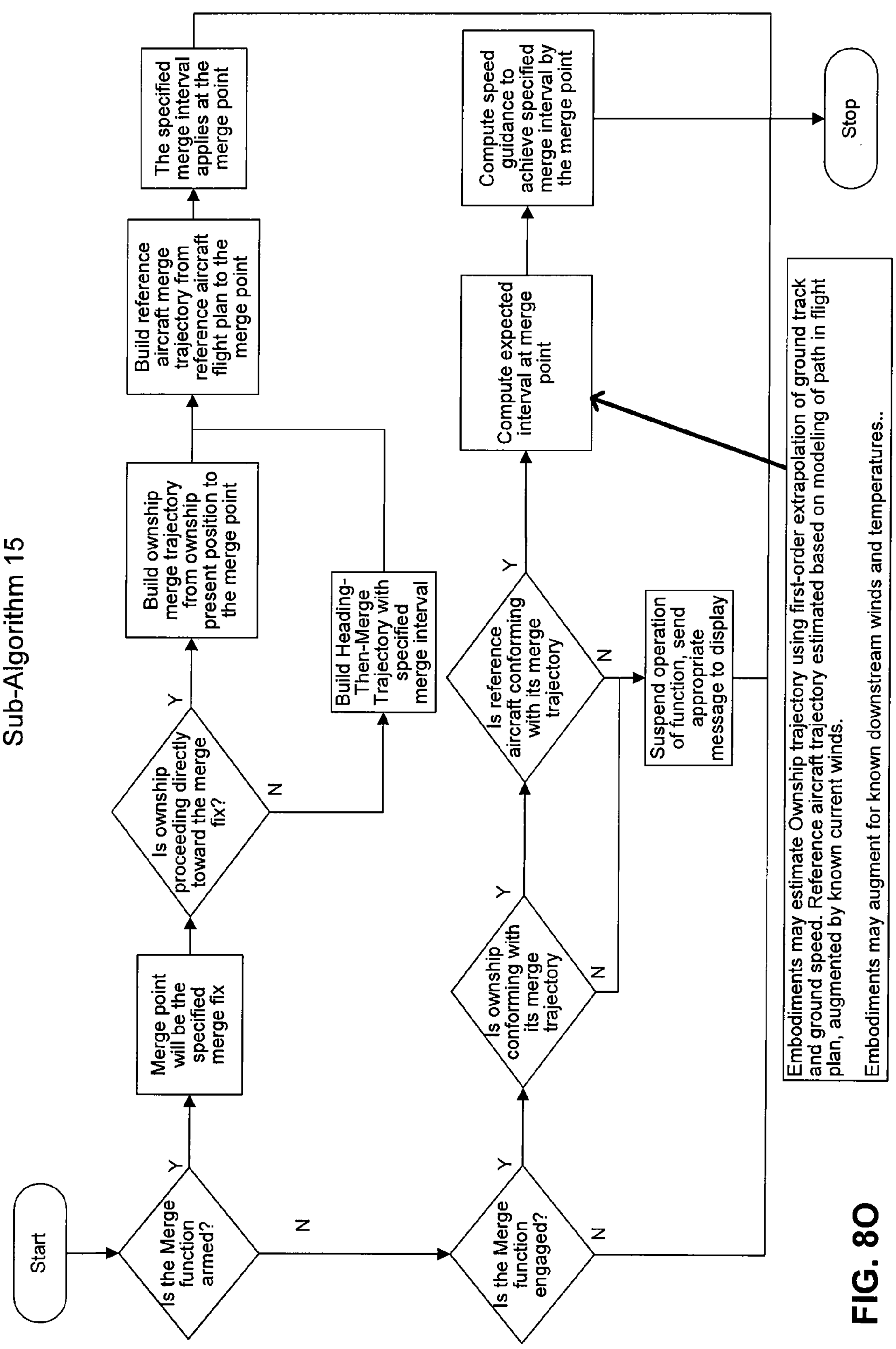
Figure 8P:
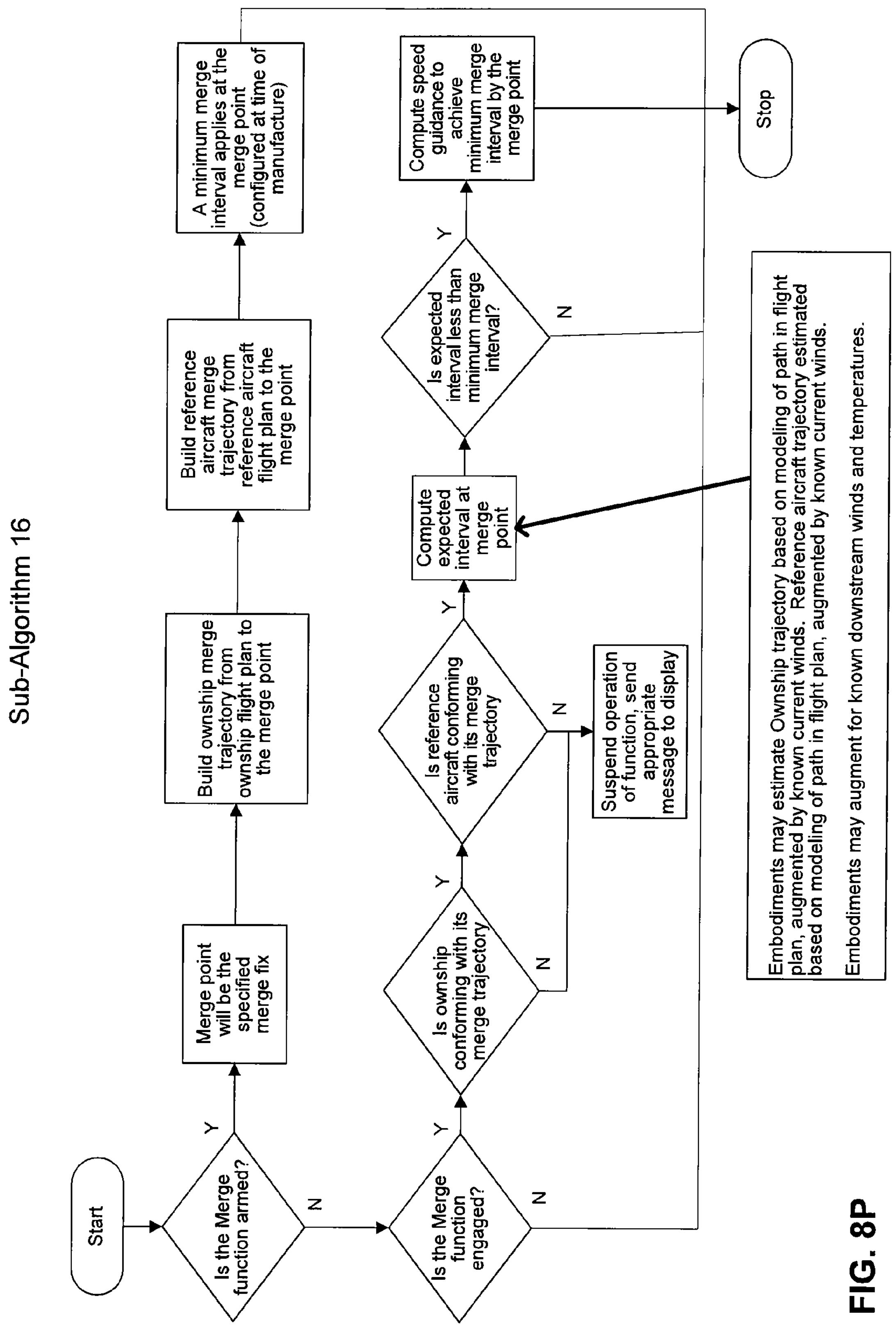
Figure 8Q:
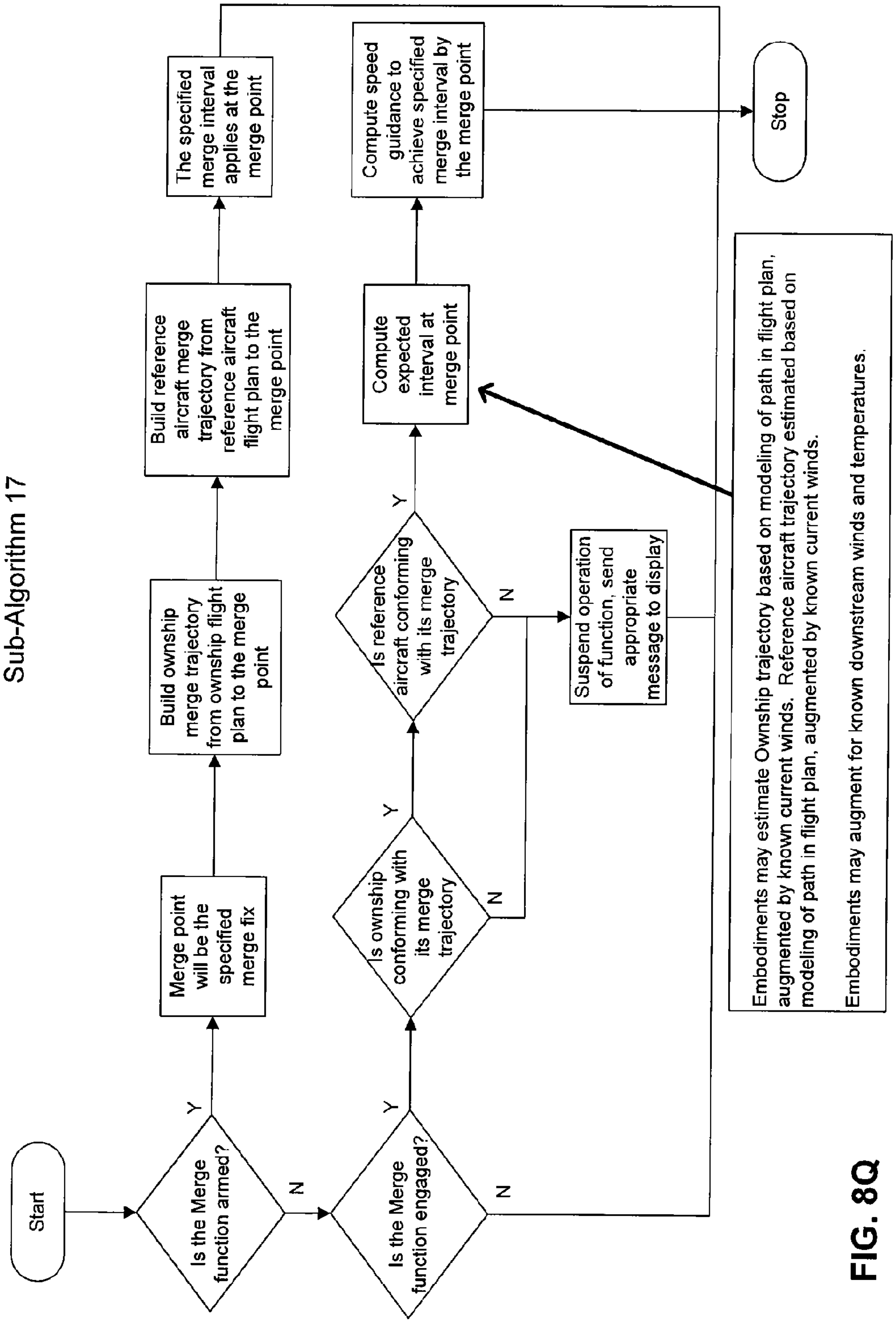
Figure 8R:
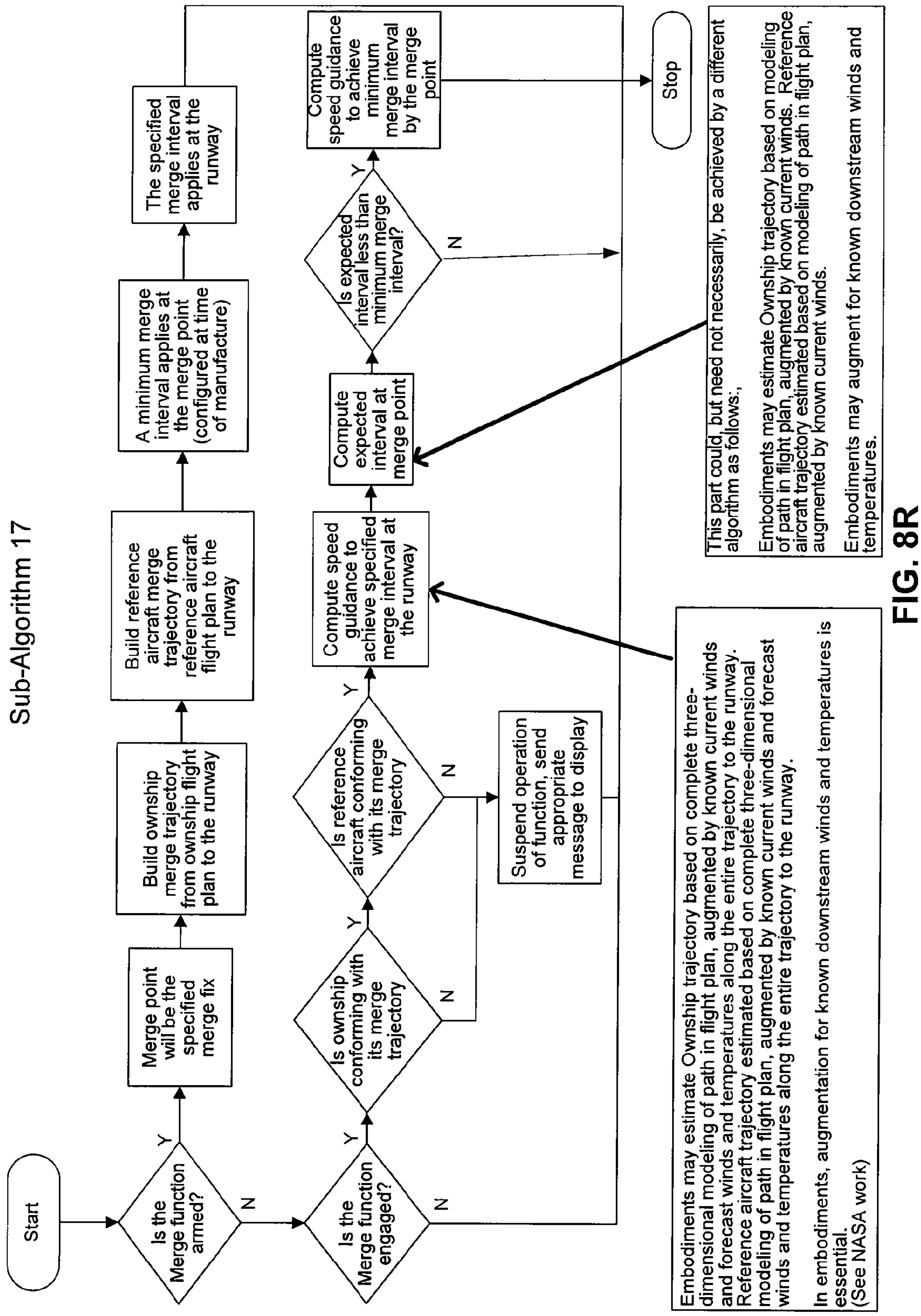

As would be clear to one skilled in the art, in different embodiments, that Table 2 may be added to, deleted from and otherwise modified without departing from the spirit of the invention. Examples of the sub-algorithms 1-18 are depicted in FIGS. 8A-8R.

In embodiments, once the sub-algorithm has been selected in step 715, the function may be armed. When this armed function is engaged, and this engagement is detected by step 720, step 725 will run the algorithm selected in step 715.

VI. EXAMPLE COMPUTER SYSTEM IMPLEMENTATION

The present invention may be implemented using hardware, firmware, software or a combination thereof and may be implemented in a computer system or other processing system. The hardware, software or the combination may embody any of the structural or functional modules in FIGS. 1-9. In an embodiment, the invention is directed toward a computer program product executing on a computer system capable of carrying out the functionality described herein. If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

Figure 9:
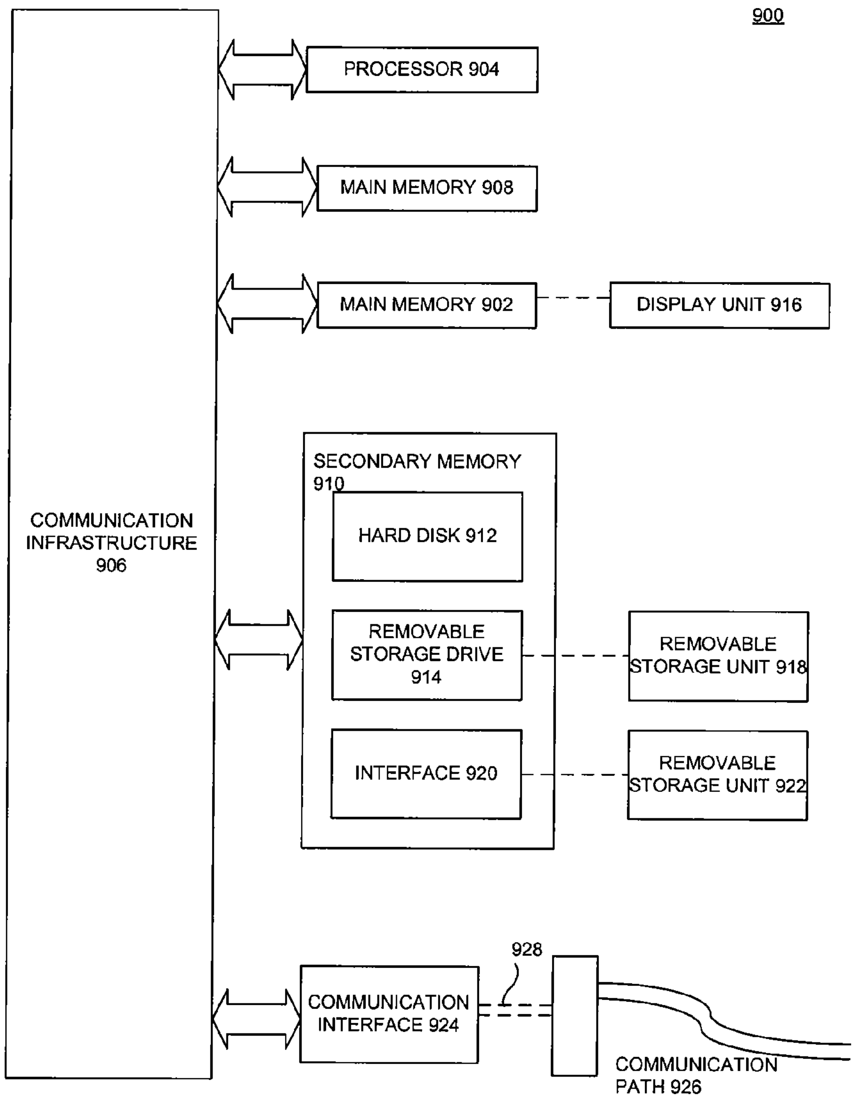
FIG. 9 depicts an example computer system implementation, according to embodiments of the present invention.

For instance, at least one processor device and a memory may be used to implement the above described embodiments. A processor device may be a single processor, a plurality of processors, or combinations thereof. Processor devices may have one or more processor 'cores.' FIG. 9 illustrates an example computer system 900 in which embodiments of the present invention, or portions thereof, may be implemented as computer-readable code. Various embodiments of the invention are described in terms of this example computer system 900. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Computer system 900 includes one or more processor devices, such as processor device 904. Processor device 904 may be a special purpose or a general purpose processor device. As will be appreciated by persons skilled in the relevant art, processor device 904 may also be a single processor in a multi-core/multiprocessor system, such system operating alone, or in a cluster of computing devices operating in a cluster or server farm. Processor device 904 is connected to a communication infrastructure 906, for example, a bus, message queue, network or multi-core message-passing scheme.

Computer system 900 also includes a main memory 908, for example, random access memory (RAM), and may also include a secondary memory 910. Secondary memory 910 may include, for example, a hard disk drive 912 and/or a removable storage drive 914. Removable storage drive 914 may comprise a floppy disk drive, a magnetic tape drive, an optical disk drive, a flash memory, or the like. The removable storage drive 914 reads from and/or writes to a removable storage unit 918 in a well known manner. Removable storage unit 918 may comprise a floppy disk, magnetic tape, optical disk, etc. which is read by and written to by removable storage drive 914. As will be appreciated by persons skilled in the relevant art, removable storage unit 918 includes a computer usable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a Universal Access Transceiver (UAT), ADS-B Receiver, VDL, modem, a network interface (such as an Ethernet card), a communications port, a PCMCIA slot and card, etc. Software and data transferred via communications interface 924 may be in the form of signals, which may be electronic, electromagnetic, optical, or other signals capable of being received by communications interface 924. These signals may be provided to communications interface 924 via a communications path 926. Communications path 926 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 918, removable storage unit 922, and a hard disk installed in hard disk drive 912.

Computer program medium and computer usable medium may also refer to memories, such as main memory 908 and secondary memory 910, which may be memory semiconductors (e.g. DRAMs, etc.).

Computer programs (also called computer control logic) are stored in main memory 908 and/or secondary memory 910. Computer programs may also be received via communications interface 924. Such computer programs, when executed, enable computer system 900 to implement the present invention as discussed herein. In particular, the computer programs, when executed, enable processor device 904 to implement the processes of the present invention. Accordingly, such computer programs represent controllers of the computer system 900. Where the invention is implemented using software, the software may be stored in a computer program product and loaded into computer system 900 using removable storage drive 914, interface 920, hard drive 912 or communications interface 924.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

VII. CONCLUSION

The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. An Automatic Dependent Surveillance-Broadcast (ADS-B) function integration apparatus operating on board an ownship vehicle, comprising:

a memory coupled to at least one processor, the at least one processor configured to implement a function integration module (FIM), the FIM coupled to different ADS-B In function modules;

and the FIM configured to integrate the different ADS-B In function modules on board the ownship vehicle to thereby simultaneously execute multiple ADS-B In functions, wherein the multiple ADS-B In functions include algorithms that provide situational awareness and guidance to at least one of flight crews and other automation system on board the ownship vehicle and relative to a reference vehicle.

2. The apparatus of claim 1, further comprising an engagement module, wherein the engagement module is configured to arbitrate between a plurality of simultaneously engaged ADS-B In functions.

3. The apparatus of claim 1, wherein the apparatus is coupled to command control logic and one or more cockpit displays.

4. The apparatus of claim 3, further comprising an output arbitrator module coupled to the command control logic and the cockpit displays, wherein the output arbitrator module is configured to select output from one or more ADS-B In function modules.

5. The apparatus of claim 3, further comprising an interface controller module (ICM) coupled to a plurality of the cockpit displays and the FIM, wherein the ICM is configured to control a differential display of information on each of the cockpit displays.

6. The apparatus of claim 1, further comprising an algorithm selection module (ASM) coupled to the integration module (FIM), the ASM configured to use one or more rules to select from a plurality of algorithms associated with the different one or more ADS-B In function modules.

7. The apparatus of claim 6, wherein each of the ADS-B In functions has a separate ASM that selects from different a plurality of algorithms associated with each ADS-B In function module.

8. A method of integrating avionics functions operating on board an ownship aircraft, comprising:

receiving, by a computing device, input from an avionics function module that executes different avionics functions, wherein the avionics function modules are Automatic Dependent Surveillance-Broadcast (ADS-B) In function modules; and determining, by the computing device, which of the avionics functions to allow to be engaged simultaneously, wherein the avionic functions include algorithms that provide situational awareness and guidance to at least one of flight crews and other automation systems on board the ownship aircraft and relative to a reference aircraft.

9. The method of claim 8, the determining step further comprising:

determining which of the avionics functions to allow to be engaged simultaneously, based on at least one or more of:

1) characteristics of the functions;

2) flight plan of ownship;

3) flight plan of the reference aircraft;

4) actual movement of ownship;

5) actual movement of the reference aircraft.

10. The method of claim 8, further comprising:

receiving outputs from the avionics function module, wherein the outputs comprise:

1) avionics function commands;

2) avionics data;

selecting among the outputs from the avionics function module; and transferring the selected outputs.

11. The method of claim 10, the selecting step further comprising:

selecting among one or more outputs from the avionics function modules based on at least one or more of the following:

1) a predetermined priority ranking of at least one function module; and 2) characteristics of output from at least one function module.

12. The method of claim 10, further comprising:

determining, prior to the transferring step, which output to transfer to each display.

13. The method of claim 10, further comprising:

determining, prior to the transferring step, which output to transfer to command control logic.

14. The method of claim 8, further comprising:

selecting an algorithm to be used by each avionics function, based on at least one of:

1) parameters supplied to avionics functions;

2) parameters supplied to avionics functions operating in one or more reference aircraft;

3) characteristics of avionics functions;

4) flight plan of ownship;

5) flight plan of one or more reference aircraft;

6) actual movement of ownship;

7) actual movement of one or more reference aircraft, 8) whether ownship is conforming to its flight plan;

9) whether reference aircraft are conforming to their respective flight plans;

10) position of ownship relative to ground features; and 11) current flight phase.

15. A computer program product comprising:

a non-transitory computer readable medium having instructions stored thereon for causing a processor to perform a method, the method comprising:

receiving input from an avionics function module that executes different avionics functions on board an ownship aircraft, wherein the avionics function modules are Automatic Dependent Surveillance-Broadcast (ADS-B) In function modules; and determining which of the avionics functions to allow to be engaged simultaneously, wherein the avionic functions include algorithms that provide situational awareness and guidance to at least one of flight crews and other automation systems on board the ownship aircraft and relative to a reference aircraft.

* * * * *